US011030701B1

(12) United States Patent
Brannan et al.

(10) Patent No.: US 11,030,701 B1
(45) Date of Patent: Jun. 8, 2021

(54) SYSTEMS AND METHODS FOR ELECTRONICALLY MATCHING ONLINE USER PROFILES

(71) Applicant: State Farm Mutual Automobile Insurance Company, Bloomington, IL (US)

(72) Inventors: Joseph Robert Brannan, Bloomington, IL (US); Brian N. Harvey, Bloomington, IL (US); Ryan Michael Gross, Normal, IL (US); J. Lynn Wilson, Normal, IL (US); Matthew Eric Riley, Sr., Heyworth, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

(21) Appl. No.: 16/454,822

(22) Filed: Jun. 27, 2019

Related U.S. Application Data

(60) Provisional application No. 62/804,661, filed on Feb. 12, 2019, provisional application No. 62/835,272, filed on Apr. 17, 2019.

(51) Int. Cl.
*G06Q 40/08* (2012.01)
*G06Q 30/06* (2012.01)
(Continued)

(52) U.S. Cl.
CPC ......... *G06Q 40/08* (2013.01); *G06F 16/9535* (2019.01); *G06Q 30/0645* (2013.01); *G06Q 50/01* (2013.01)

(58) Field of Classification Search
CPC ........ G06Q 10/00; G06Q 20/00; G06Q 30/00; G06Q 40/00; G06Q 40/08; G06Q 30/0645; G06Q 50/01; G06F 16/9535
(Continued)

(56) References Cited

U.S. PATENT DOCUMENTS 7,286,818 B2 * 10/2007 Rosenberg ........... G06Q 20/322
455/414.1
8,086,525 B2 12/2011 Atwood et al.
(Continued)

FOREIGN PATENT DOCUMENTS

CN 102681973 A 9/2012

OTHER PUBLICATIONS

"Smart Driving Could Payoff", Ipswich(UK), ProQuest ID 1112355023, 10-17 . (Year: 2012).*
(Continued)

*Primary Examiner* — Frantzy Poinvil
(74) *Attorney, Agent, or Firm* — Armstrong Teasdale LLP

(57) ABSTRACT

A matching computer system for electronically generating, matching, and providing online user profiles, and determining a trust score for a user based upon at least social media data and insurance data is provided. The matching computer system may be configured to register users within the matching computer system, receive consent from the users to capture the social media data, and collect the social media data and the insurance data from each registered user. The matching computer system may be also configured to retrieve the social media data and the insurance data associated with each registered user. The matching computer system may be further configured to determine a trust score for each registered user based upon each respective social media data and each respective insurance data. Each trust score represents a level of trustworthiness of the user.

21 Claims, 13 Drawing Sheets

(51) Int. Cl.
 *G06Q 50/00* (2012.01)
 *G06F 16/9535* (2019.01)
(58) Field of Classification Search
 USPC .................................................... 705/3–44
 See application file for complete search history.

(56) References Cited

U.S. PATENT DOCUMENTS

| | | | |
|---|---|---|---|
| 8,571,885 B2* | 10/2013 | Andros | G06Q 50/24 705/2 |
| 8,682,698 B2 | 3/2014 | Cashman et al. | |
| 8,776,180 B2 | 7/2014 | Kumar et al. | |
| 8,799,028 B1* | 8/2014 | Warden | G06Q 10/0635 705/4 |
| 8,972,872 B2* | 3/2015 | Labrou | G06F 8/00 715/744 |
| 9,363,283 B1 | 6/2016 | Herrera-Yagüe et al. | |
| 9,501,791 B2 | 11/2016 | Dziuk | |
| 9,674,205 B2 | 6/2017 | Kirkham et al. | |
| 9,740,709 B1 | 8/2017 | Mawji et al. | |
| 2009/0138335 A1 | 5/2009 | Lieberman | |
| 2012/0124057 A1 | 5/2012 | Daoud et al. | |
| 2012/0166228 A1* | 6/2012 | Singleton | G06Q 40/08 705/4 |
| 2013/0073473 A1 | 3/2013 | Heath | |
| 2013/0291098 A1 | 10/2013 | Chung et al. | |
| 2013/0339065 A1* | 12/2013 | Denning | G06Q 40/08 705/4 |
| 2014/0039935 A1* | 2/2014 | Rivera | G06Q 40/08 705/4 |
| 2014/0164218 A1 | 6/2014 | Stewart | |
| 2014/0180811 A1* | 6/2014 | Boal | G06Q 30/0269 705/14.53 |
| 2014/0249872 A1* | 9/2014 | Stephan | G06Q 10/063 705/7.11 |
| 2015/0025980 A1* | 1/2015 | Zaretsky | G06Q 30/0275 705/14.71 |
| 2015/0032481 A1* | 1/2015 | Norling-Christensen | G06Q 40/08 705/4 |
| 2015/0187014 A1* | 7/2015 | Adams | G06Q 40/08 705/4 |
| 2015/0187016 A1* | 7/2015 | Adams | G06Q 40/08 705/4 |
| 2015/0187019 A1* | 7/2015 | Fernandes | G06Q 40/08 705/4 |
| 2015/0206211 A1* | 7/2015 | Stoll | G06Q 50/01 705/26.1 |
| 2015/0278917 A1* | 10/2015 | Stoll | G06Q 50/01 705/26.7 |
| 2015/0278919 A1* | 10/2015 | Stoll | G06Q 30/0609 705/26.7 |
| 2016/0019614 A1* | 1/2016 | Dziuk | G06Q 30/0613 705/38 |
| 2016/0189242 A1* | 6/2016 | Bhagwan | G06Q 30/0275 705/14.42 |
| 2016/0203575 A1* | 7/2016 | Madhu | G06F 21/577 705/319 |
| 2016/0212071 A1 | 7/2016 | Hannah et al. | |
| 2017/0134366 A1 | 5/2017 | Genner et al. | |
| 2018/0293581 A1 | 10/2018 | Bansal | |
| 2018/0322597 A1 | 11/2018 | Sher | |
| 2019/0073676 A1 | 3/2019 | Wang | |

OTHER PUBLICATIONS

Dijksterhuis et al., "In-car usage-based insurance feedback strategies. A comparative driving simulator study", Ergonomics, 59:9, 1158-1170, DOI: 10.1080/00140139.2015.1127428. (Year: 2016).*
Finley, K. (2013). Trust in the sharing economy: An exploratory study. MA Global Media and Communication, 1257276, Best Student 2012-13, Centre for Cultural Policy Studies, University of Warwick. Retrieved Jul. 11, 2019 from https://warwick.ac.uk/fac/arts/theatre_s/cp/research/publications/madiss/ccps_a4_ma_gmc_kf_3.pdf.
Marlow, P. (2017). Digitising reputation pays off in the rental market. Retrieved Jul. 11, 2019 from https://www.suncorpgroup.com.au/news/features/digitising-reputation-pays-off-in-the-rental-market.

* cited by examiner

SYSTEMS AND METHODS FOR ELECTRONICALLY MATCHING ONLINE USER PROFILES

CROSS-REFERENCE TO RELATED APPLICATIONS

This application claims the benefit of priority to U.S. Provisional Patent Application No. 62/804,661, filed Feb. 12, 2019, entitled "SYSTEMS AND METHODS FOR ELECTRONICALLY MATCHING ONLINE USER PROFILES," and to U.S. Provisional Patent Application No. 62/835,272, filed Apr. 17, 2019, entitled "SYSTEMS AND METHODS FOR ELECTRONICALLY MATCHING ONLINE USER PROFILES," the entire contents and disclosures of which are hereby incorporated herein by reference in their entirety.

FIELD OF THE DISCLOSURE

The present disclosure generally relates to electronically matching online user profiles and, more particularly, to network-based systems and methods for leveraging social media data and insurance data to create and match online user profiles.

BACKGROUND

At least some known computer networks have enabled users to increasingly interact with each other. With the advent of technology-based social interaction, the sharing of resources and activities within local communities has increased dramatically. However, due to the lack of in person interaction between users, many users are unwilling to trust other users, specifically when performing peer-to-peer buying/selling, renting, and/or sharing products and services using these known computer networks.

Therefore, there is a need for networking architecture that may be used to provide reliable, transparent, and secure information about users to other users.

BRIEF SUMMARY

The present embodiments may relate to systems and methods for electronically generating, matching, and providing online user profiles, and determining a sharing score between the online user profiles. The system may include a matching computing device, one or more insurance provider servers, one or more client systems, one or more social media servers, one or more third party servers, and/or one or more databases.

In one aspect, a matching computer system for determining a trust score for a user based upon at least social media data and insurance data is provided. The matching computer system may include a processor in communication with at least one memory device. The processor may be configured to: (i) register, with the matching computer system, one or more users; (ii) receive consent from the one or more users to capture social media data associated with social media activities of each respective user; (iii) collect the social media data and insurance data from each registered user; (iv) retrieve the social media data and the insurance data associated with each registered user; and/or (v) determine a trust score for each registered user based, at least in part, upon each respective social media data and each respective insurance data, wherein the trust score represents a level of trustworthiness of the user. The computer system may include additional, less, or alternate functionality, including that discussed elsewhere herein.

In another aspect, a computer-implemented method for determining a trust score for a user based upon at least social media data and insurance data is provided. The method may be implemented by a matching computer system including at least one processor. The method may include: (i) registering, with the matching computer system, one or more users; (ii) receiving consent from the one or more users to capture social media data associated with social media activities of each respective user; (iii) collecting the social media data and insurance data from each registered user; (iv) retrieving the social media data and the insurance data associated with each registered user; and/or (v) determining a trust score for each registered user based, at least in part, upon each respective social media data and each respective insurance data, wherein the trust score represents a level of trustworthiness of the user. The method may include additional, less, or alternate actions, including those discussed elsewhere herein.

In yet another aspect, at least one non-transitory computer-readable storage media having computer-executable instructions embodied thereon for determining a trust score for a user based upon at least social media data and insurance data is provided. When executed by at least one processor, the computer-executable instructions cause the processor to: (i) register, with the matching computer system, one or more users; (ii) receive consent from the one or more users to capture social media data associated with social media activities of each respective user; (iii) collect the social media data and insurance data from each registered user; (iv) retrieve the social media data and the insurance data associated with each registered user; and/or (v) determine a trust score for each registered user based, at least in part, upon each respective social media data and each respective insurance data, wherein the trust score represents a level of trustworthiness of the user. The instructions may direct additional, less, or alternate functionality, including that discussed elsewhere herein.

In another aspect, a matching computer system for determining a sharing score between online user profiles is provided. The matching computer system may include a processor in communication with at least one memory device. The processor may be configured to: (i) generate a first online user profile associated with a first user, wherein the first online user profile comprises at least one of first insurance data, first social media data, first third party data, first user data, and first sharing data associated with a first user; (ii) generate a second online user profile associated with a second user, wherein the second online user profile comprises at least one of second insurance data, second social media data, second third party data, second user data, and second sharing data associated with a second user; (iii) calculate a first base score associated with the first user based upon the first online user profile, wherein the first base score represents a first level of trustworthiness of the first user; (iv) calculate a second base score associated with the second user based upon the second online user profile wherein the second base score represents a second level of trustworthiness of the second user; and/or (v) determine a sharing score between the first and second users based upon the first and second base scores, wherein the sharing score represents a level of matching between the first online user profile and the second online user profile. The computer system may include additional, less, or alternate functionality, including that discussed elsewhere herein.

In yet another aspect, a computer-implemented method for determining a sharing score between online user profiles is provided. The method may be implemented by a matching computer system including at least one processor. The method may include: (i) generating a first online user profile associated with a first user, wherein the first online user profile comprises at least one of first insurance data, first social media data, first third party data, first user data, and first sharing data associated with a first user; (ii) generating a second online user profile associated with a second user, wherein the second online user profile comprises at least one of second insurance data, second social media data, second third party data, second user data, and second sharing data associated with a second user; (iii) calculating a first base score associated with the first user based upon the first online user profile, wherein the first base score represents a first level of trustworthiness of the first user; (iv) calculating a second base score associated with the second user based upon the second online user profile wherein the second base score represents a second level of trustworthiness of the second user; and/or (v) determining a sharing score between the first and second users based upon the first and second base scores, wherein the sharing score represents a level of matching between the first online user profile and the second online user profile. The method may include additional, less, or alternate actions, including those discussed elsewhere herein.

In another aspect, at least one non-transitory computer-readable storage media having computer-executable instructions embodied thereon for determining a sharing score between online user profiles is provided. When executed by at least one processor, the computer-executable instructions cause the processor to: (i) generate a first online user profile associated with a first user, wherein the first online user profile comprises at least one of first insurance data, first social media data, first third party data, first user data, and first sharing data associated with a first user; (ii) generate a second online user profile associated with a second user, wherein the second online user profile comprises at least one of second insurance data, second social media data, second third party data, second user data, and second sharing data associated with a second user; (iii) calculate a first base score associated with the first user based upon the first online user profile, wherein the first base score represents a first level of trustworthiness of the first user; (iv) calculate a second base score associated with the second user based upon the second online user profile wherein the second base score represents a second level of trustworthiness of the second user; and/or (v) determine a sharing score between the first and second users based upon the first and second base scores, wherein the sharing score represents a level of matching between the first online user profile and the second online user profile. The instructions may direct additional, less, or alternate functionality, including that discussed elsewhere herein.

In yet another aspect, a matching computer system for determining a sharing score between online user profiles is provided. The matching computer system may include a processor in communication with at least one memory device. The processor may be configured to: (i) receive a user-listing associated with a first user, wherein the user-listing includes a plurality of items offered for at least sale, rent, and lease, and wherein the first user is associated with a first user-type corresponding to an owner; (ii) calculate an item base score for each of the plurality of items, each item base score calculated based upon a first online user profile associated with the first user; (iii) calculate a second user base score based upon a second online user profile associ- ated with a second user, wherein the second user is associated with a second user-type corresponding to a renter; and/or (iv) determine a sharing score between each of the plurality of items and the second user, wherein each sharing score is based upon each respective item base score and the second user base score, and wherein each sharing score represents a level of matching between each item and the second online user profile. The computer system may include additional, less, or alternate functionality, including that discussed elsewhere herein.

In another aspect, a computer-implemented method for determining a sharing score between online user profiles is provided. The method may be implemented by a matching computer system including at least one processor. The method may include: (i) receiving a user-listing associated with a first user, wherein the user-listing includes a plurality of items offered for at least sale, rent, and lease, and wherein the first user is associated with a first user-type corresponding to an owner; (ii) calculating an item base score for each of the plurality of items, each item base score calculated based upon a first online user profile associated with the first user; (iii) calculating a second user base score based upon a second online user profile associated with a second user, wherein the second user is associated with a second user-type corresponding to a renter; and/or (iv) determining a sharing score between each of the plurality of items and the second user, wherein each sharing score is based upon each respective item base score and the second user base score, and wherein each sharing score represents a level of matching between each item and the second online user profile. The method may include additional, less, or alternate actions, including those discussed elsewhere herein.

In yet another aspect, at least one non-transitory computer-readable storage media having computer-executable instructions embodied thereon for determining a sharing score between online user profiles is provided. When executed by at least one processor, the computer-executable instructions cause the processor to: (i) receive a user-listing associated with a first user, wherein the user-listing includes a plurality of items offered for at least sale, rent, and lease, and wherein the first user is associated with a first user-type corresponding to an owner; (ii) calculate an item base score for each of the plurality of items, each item base score calculated based upon a first online user profile associated with the first user; (iii) calculate a second user base score based upon a second online user profile associated with a second user, wherein the second user is associated with a second user-type corresponding to a renter; and/or (iv) determine a sharing score between each of the plurality of items and the second user, wherein each sharing score is based upon each respective item base score and the second user base score, and wherein each sharing score represents a level of matching between each item and the second online user profile. The instructions may direct additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
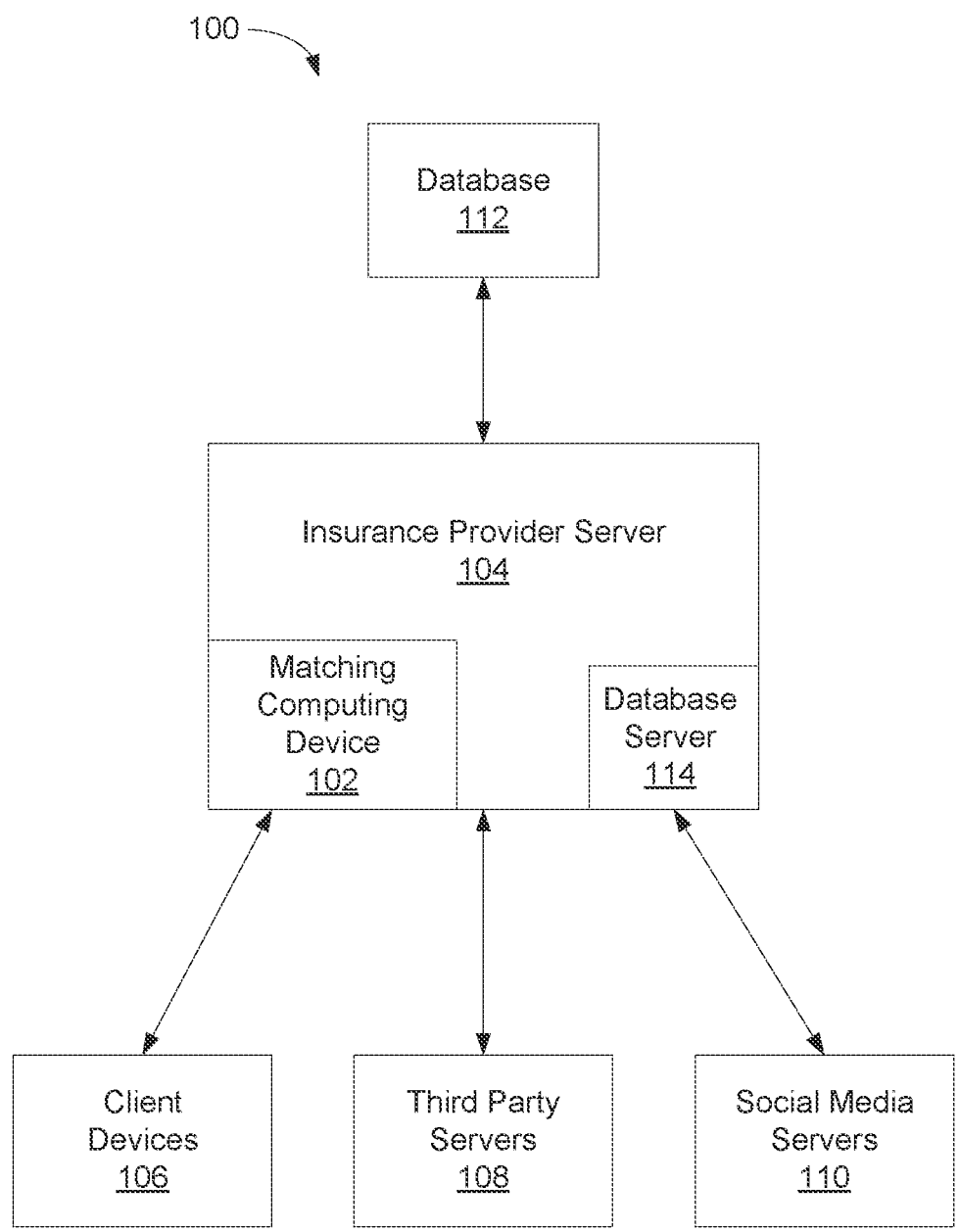
FIG. 1 illustrates an exemplary matching computer system for electronically matching profiles in accordance with the present disclosure.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

By partnering with a social media platform, such as Facebook®, an insurance provider, such as State Farm®, may be able to use data metrics collected by social media, as well as insurance data, to create a "trust score" (also referred to herein as "base score") that would rate users based upon several criteria. This criteria would include, but would not be limited to, insurance claims, credit score, telematics data, payment history, tenure, as well the social media activities, such as how long the users have been on the platform, number of posts, the degree to which the dependent people are connected and history on the marketplace. The trust score represents a level of reliability (e.g., trustworthiness) of a user associated with an online user profile, as discussed elsewhere herein.

Customers are unwilling to trust strangers when peer-to-peer (P2P) buying/selling or sharing products and services online. Furthermore customers are wanting a way to vet others to know the transaction is safe. Also, it is believed that currently there are no services bringing together multiple data points to create a trust score for P2P transactions.

With the present embodiments, an entity or computer system will leverage the ability to quickly and efficiently gather data with a user's permission or affirmative consent (e.g., auto, home, and insurance data, as well as credit history and telematics data) to create one half of trusting score system for a P2P transaction. This system will be combined with key metrics of a social media platform (tenure, connections, engagement, etc.) to complete a trustworthy scoring system.

The scoring computer system will be used in a P2P sharing platform which could actually be launched on one of various social media platforms. Furthermore, this platform or system may be configured to provide a feedback loop which will increase the accuracy of the scoring system. By utilizing a customer rating system for every transaction, the computer system will be able to automatically update and refine the weighting and scoring algorithm.

With the present embodiments, using data from insurance increases security and trust-worthiness of the social media platform while the social media platform will help increases user engagement. The system would "live" on the social media platform, but would include the entity's, such as an insurance provider's, scoring data (for instance, an entity may not be sharing credit information or other data, rather just a composite score)—and the insurance provider (or other entity) may also provide the insurance on the P2P platform. For instance, for every P2P transaction, such as home rental or vehicle rental, UBI (usage-based insurance) may be offered and/or quote based upon one or more scores, composite scores, trustworthiness scores, and/or home, vehicle, or user risk profiles.

An exemplary scoring system is outlined below. Exemplary scoring metrics for an insurance provider and social media may include the following.

|  | State Farm | | | | | Social Media | | | | |
| --- | --- | --- | --- | --- | --- | --- | --- | --- | --- | --- |
|  |  |  |  |  |  | Connection | | Market | | Similar |
|  | Telematics | Payment History | Credit Report | Claims History | Tenure | of friends | Tenure | Place History | Engagement | social circles |
| Weight | .15 | .05 | .1 | .2 | 0.5 | .1 | .05 | .05 | .15 | .05 |
| Score | 8 | 10 | 7 | 8 | 3 | 6 | 9 | 4 | 10 | 8 |
| Weighted Score | 1.2 | .5 | .7 | 1.6 | .15 | .6 | .45 | .6 | .5 | .4 |

This example would give a total weighted score or trust score of 6.7 out of 10. This weighted score would change as history on social media and/or insurance data changes.

Exemplary Sharing Score Overview

The present embodiments may include a computer system that generates or calculates a "Sharing Score." The "Sharing Score" is a number that is computed when there is a potential car sharing transaction between two people. This number is mathematically derived using a combination of data provided by an insurance provider and a social media platform, such as telematics and other insurance-related data, and social media activity-related data.

Each individual person may have their own "Base Score" computed from a combination of insurance data and social media as shown in the table below (exemplary insurance factors displayed in columns 2-6, and exemplary social media factors in columns 6-8). Different criteria is used based on the role of the individual as either an owner or renter of a vehicle. FB is short for Facebook®.

The Base Scores of an individual renter and individual owner are mathematically combined to create a unique Sharing Score. Additional data may be used to create the Sharing Score, which may include date related to, but not limited to, mutual friends and similar interests on social media, such as Facebook®.

| Owner | Rating | Background Check | Insurance | Current Tagged Titled | Maintenance | # of FB Friends | Activity on FB | Length of time on FB |
|---|---|---|---|---|---|---|---|---|
| Renter | Rating | Background Check | Driver's License | Driving Record | Telematics | # of FB Friends | Activity on FB | Length of time on FB |

Figure 13:
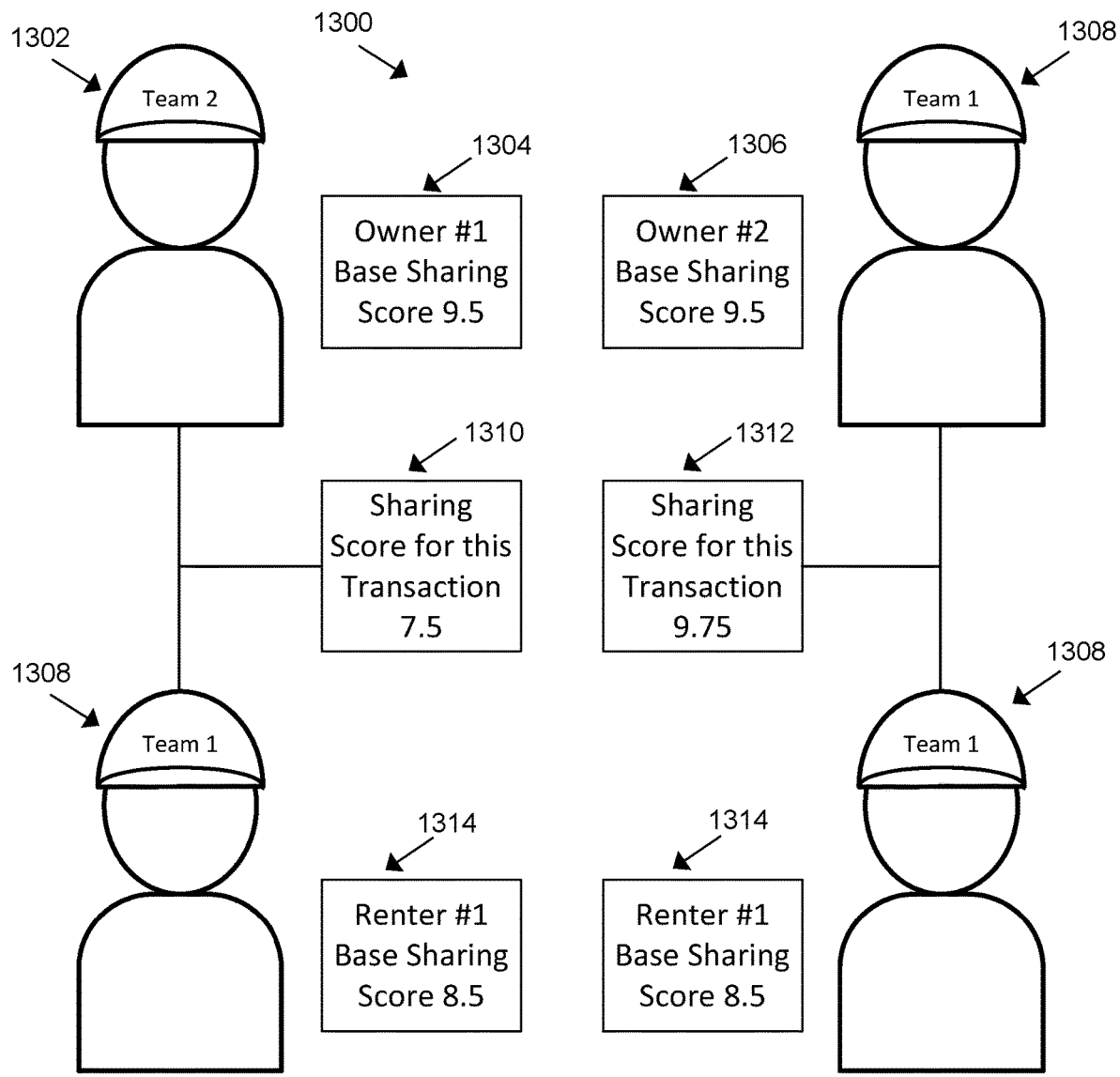
FIG. 13 illustrates an exemplary diagram of a sharing score calculation implemented by the matching computer system shown in FIG. 1.

FIG. 13 illustrates a diagram 1300 of a sharing score calculation. Diagram 1300 shows that Renter #1 has a base sharing score of 8.5 (shown in block 1314) and is not as connected to Owner #1, who has a base sharing score of 9.5 (shown in block 1304), as compared to Owner #2, who also has a base sharing score of 9.5 (shown in block 1306). For example, Renter #1 and Owner #2 may be more connected because both of them like the same team 1308, whereas Renter #1 and Owner #1 may not be as connected because they like different teams (e.g., Renter #1 likes team 1308 and Owner #1 likes team 1302). Because of this lower connection level, the overall Sharing Score dropped to 7.5 between Renter #1 and Owner #1, as shown in block 1310. Since Renter #1 is more connected to Owner #2, the overall Sharing Score increases to 9.75, as shown in block 1312. In this example, Renter #1 should feel more confident renting from Owner #2 and vice-versa.

Exemplary Matching

The systems and methods described herein relate to, inter alia, systems and methods for generating, matching, and providing online user profiles based upon social media data, insurance data, third party data, and user data. In at least one embodiment, a matching computer system may include a matching computing device, an insurance provider server, a social media server, a third party server, a client device, and a database. In other embodiments, the matching computer system may include a plurality of matching computing devices, insurance provider servers, social media servers, third party servers, client devices, and databases.

In the exemplary embodiment, the methods may be performed by the matching computing device. The matching computing device may be in communication with the insurance provider server, the social media server, the third party server, the client device, and the database. The matching computing device may be configured to receive and/or transmit insurance data from/to the insurance provider server, social media data from/to the social media server, third party data from/to the third party server, user data and/or sharing data from/to the client device, and/or user profile data from/to the database. The matching computer system may use the data described above to build, store, and update online user profiles, generate a base score for each online user profile, compare online user profiles, and generate "sharing scores" based upon the comparison.

In the exemplary embodiment, the matching computing device is configured to build online user profiles (e.g., owner profile or renter profile) corresponding to different types of users or user-types (e.g., owner, lessor, renter, or lessee). For example, a user may be an owner or lessor of a vehicle seeking to rent or lease his/her own vehicle to another user. The matching computing device may be configured to build an owner profile for the owner or lessor. In another example, a user may be seeking to rent or lease a vehicle from another user. The matching computing device may be configured to build a renter profile for the user seeking to rent or lease (e.g., renter or lessee). In the exemplary embodiment, the matching computing device may generate or calculate a base score for that particular user based upon the type of user, the insurance data, the social media data, the third party data, the user data, and/or the user profile data.

The base score represents, for example, a level of reliability (e.g., trustworthiness) of a user associated with an online user profile. For example, a high base score for an owner of a vehicle may represent that the owner has not had accidents with the vehicle, has kept maintenance of the vehicle on schedule, does not have convictions on his/her background check, has high activity on social media (e.g., daily interaction on social media), and/or has been on social media for a long period of time (e.g., more than a predefined period of time). In contrast, a low score for an owner of a vehicle may represent that the owner has had accident with the vehicle, has not kept maintenance of the vehicle on schedule, convictions on his/her background check, has low activity on social media (e.g., once a week interaction on social media), and/or has been on social media for a short period of time (e.g., less than a predefined period of time).

In another example, a high score for a renter of a vehicle may represent that the renter has no traffic tickets on his/her driving record, does not have convictions on his/her background check, is a conservative driver based upon his/her vehicle telematics, has high activity on social media (e.g., daily interaction on social media), and/or has been on social media for a long period of time (e.g., more than a predefined period of time). In contrast, a low score for a renter of a vehicle may represent that the renter has traffic tickets on his/her driving record, has convictions on his/her background check, is an aggressive driver based upon his/her vehicle telematics, has low activity on social media (e.g., once a week interaction on social media), and/or has been on social media for a short period of time (e.g., less than a predefined period of time).

By building, storing, and updating the online user profiles, the matching computing device avoids re-computing from scratch each online user profile. Thus, by building and pre-storing the online user profiles, the matching computer system improves bandwidth usage and processing speeds.

In the exemplary embodiment, the matching computing device receives user data from one or more client devices associated with the users. The matching computing device may use the user data to register the users within the matching computer system. For example, a user may download a computer application to her client device (e.g., a user computing device) and input user data into the computer application for registration with the matching computer system. The user may also access a website of the matching computer system using a web browser, and input user data into the website to register with the matching computer system.

The matching computing device may also use the user data to generate and update online user profiles. In the example embodiment, the user data may include vehicle telematics, a user identifier, a user name, a user password, a client device IP address, user email address, a user location (e.g., user home address, user work address, or any other location the user may input), user phone number, user financial account information, user vehicle information (e.g., vehicle make, model, type, year, license plate number, picture(s), feature(s), mileage, rental price, or the like) and/or other data associated with a vehicle of the user and/or the user.

In the exemplary embodiment, user data may include a user-type, which may be used to categorize online user profiles. In one embodiment, a user may be a provider of goods and/or services. For example, the provider may be an owner of a vehicle seeking to rent his/her own vehicle to another user, and this user's user-type may be "owner" or "lessor." In another embodiment, a user may be a consumer. For example, the consumer may be seeking to rent a vehicle from another user, and this user's user-type might be "renter" or "lessee." In other embodiments, the users may be users seeking to share (for value or not) other types of goods or services, such as real estate (e.g., apartments, houses, or the like), venues (e.g., pavilions, conference rooms, restaurants, sports venues, or the like), catering services, and other goods or services that may be shared between users. The user-type of a user may be manually selected by the user or it may be automatically assigned by the matching computing device (e.g., a default type of user when none is selected by the user). Additionally, a user may select multiple user-types, such as "renter" and "owner."

In the exemplary embodiment, user data may also include user-listings, which may include items, such as good(s) and/or service(s) a user wants to display, offer for sale, offer for rent, and/or offer to lease to other users. In the exemplary embodiment, user-listings are associated with owner profiles and may include vehicles owned by the user that the user wishes to rent out to other users. Multiple user-listings may be included in any given owner profile. For example, an owner may list multiple vehicles for rent, which the matching computing device may display in the form of a list on a client device.

In the exemplary embodiment, the matching computing device may also receive social media data from one or more social media servers associated with social media (e.g., FACEBOOK®, INSTAGRAM®, SNAPCHAT®, GOOGLE™ or other type of social media). The matching computing device may use the social media data to register users with the matching computer system. For example, a user may download a computer application to her client device (e.g., a user computing device) and access a social media site for registration with the matching computer system. The user may also access a website of the matching computer system using a web browser, and access a social media site from the website to register with the matching computer system. The matching computing device may also use the social media data to generate and update online user profiles. The social media data may include a social media identifier, a social media name (e.g., FACEBOOK®, INSTAGRAM®, SNAPCHAT®, or other social network names), a user identifier, a user name, a number of followers and/or friends associated with each social media, liked pages, marketplace data, and/or other social media data associated with the user.

In the exemplary embodiment, the matching computing device may receive third party data from one or more third party servers. The matching computing device may use the third party data to update online user profiles. For example, the matching computing device may receive credit score information from a third party server associated with a credit bureau agency (e.g., Experian®, TransUnion®, Equifax®) and update online user profiles accordingly. The third party data may include credit data (e.g., credit score, credit bureau identifier, user identifier, credit history, and/or other data associated with the credit information), public record data (e.g., public records available to the public, such as public offenses committed by users, an individual identifier, a type of offense, a time and date of offense, a place of offense, and/or other data associated with public records), vehicle history reports (e.g., CARFAX™, AUTOCHECK® by Experian, or the like) and/or other data that a third party may provide to the matching computing device.

In the exemplary embodiment, the matching computing device may receive insurance data from one or more insurance provider servers. The matching computing device may use the insurance data to update online user profiles. For example, the matching computing device may receive an insurance claim from an insurance provider server associated with an insurance provider (e.g., State Farm) and update online user profiles accordingly. The insurance data may include similar data points to the third party data, such as public record data and credit data, and the user data, such as vehicle telematics. The insurance data may also include insurance provider identifier, insurance type, insurance coverage, insurance tenure, insurance payment history, a number of insurance claims, insurance type of claims, insurance driving rating, background check, driver license number, driving record, telematics data, maintenance records, current tagged title, and/or other data that an insurance provider may provide to the matching computing device.

In the exemplary embodiment, the matching computing device may receive sharing data from client devices. The sharing data may include data such as peer experience ratings, experience comments, length of rental, and/or other sharing data that users may input regarding their experience while sharing a good and/or service. The matching computing device may also compute historical sharing data, such as a number of times an user has requested to share and/or has shared a good and/or service, an overall peer experience rating (e.g., computing a rating based upon peer experience received), number of times a user has accepted and/or declined to share, and/or other historical sharing data that the matching computing device may compute based upon data associated with user sharing activity.

In the exemplary embodiment, the matching computing device may store insurance data, social media data, third party data, user data, and/or sharing data in a database. The matching computing device may use any of the stored data to generate online user profile data for each online user profile. The matching computing device may also use the online user profiles, and particularly, the user profile data to generate a base score for each online user profile, compare the online user profiles to other online user profiles, and generate sharing scores based upon the comparison.

The sharing score represents an overall matching of online user profiles. More specifically, a high sharing score represents users having online user profiles that more closely match one another, and thus indicates a high likelihood that two users would be a good fit for sharing goods and/or services. In contrast, a low sharing score represents users having online user profiles that do not closely match one another, and thus indicates a high likelihood that two users would not be a good fit for sharing goods and/or services.

Concurrent to or after generating the online user profile, the matching computing device is configured to compute a base score for each online user profile, and store the base score with its corresponding online user profile. In the exemplary embodiment, the matching computing device uses insurance data and social media data to compute base scores. In other embodiments, the matching computing device may use other data, such as user data, sharing data, user profile data, and/or other suitable data that enables matching computing device to compute base scores.

Based upon the type of user associated with each online user profile, the matching computing device is configured to determine the type of data that may be used to generate each base score. For example, the matching computing device may generate a base score for an owner using insurance data, such as insurance type, current tagged titled, and vehicle maintenance, whereas for generating a base score for a renter, the matching computing device may use other insurance data, such as driver's license number, driving record, and vehicle telematics.

In an alternative embodiment, the matching computing device may generate a base score for each item listed in a user-listing of an owner based upon data associated with the owner profile and the particular user-listing. For example, the matching computing device may use insurance data and social media data to determine a base score for an owner and further use data about a particular vehicle listed by the owner to determine a base score for the vehicle.

In the exemplary embodiment, the matching computing device is configured to generate a sharing score between two users based upon data contained in the online user profile associated with each user. In one embodiment, the matching computing device calculates a sharing score between two users based upon a base score for a first user and a base score for a second user. For example, the matching computing device may compute a sharing score for a renter and an owner based upon the base scores for the two users. The higher the sharing score, the better the match between the renter and the owner. In contrast, the lower the sharing score, the poorer the match between the two users.

The sharing score is a number representing the likelihood that two users would be a good fit for sharing goods and/or services. This number is mathematically derived using a combination of data associated with the two users, such as insurance data provided by an insurance provider server, social media data provided by a social media server, third party data provided by a third party server, user data and/or sharing data provided by a client device, a base score for each user, and/or any other data retrieved from a database. The matching computing device may be configured to store the sharing scores in a database.

For example, a user A, a user B, and a user C may register with the matching computer system each using a client device. After registering with the matching computer system, the matching computing device is configured to generate an online user profile for each user. For sake of simplicity, in this example, users A and B each select to be an owner of a vehicle (e.g., user-type: owner), and user C selects to be a renter of a vehicle (e.g., user-type: renter). In other examples, user A, user B, and/or user C may select to be an owner, a renter, or both, of a vehicle or of other types of goods and/or services. After the type of user has been selected, the matching computing device is configured to compute a base score for each user. In this example, the matching computing device computes a base score of 9.5 for user A, a base score of 9.5 for user B, and a base score of 8.5 for user C. In this example, the base score is based upon a scale 0 to 10. This scale can be different in different embodiments.

The matching computing device may parse one or more social media servers and retrieve social media data, such as liked pages and/or following entities (e.g., people and/or institutions) by the users. In this example, the matching computing device retrieves, from one or more social media servers, information related to liked pages and/or following entities that are associated with baseball. By retrieving this information, the matching computing device is able to determine the baseball team that each user likes. The matching computing device may use the liked baseball teams as a factor to compute a sharing score between two users.

In this example, the matching computing device determines that user A likes Team 1 and users B and C like Team 2. Team 1 being a different team than Team 2. Team 1 being a rival of Team 2. After making the determination, the matching computing device may add or include the liked teams to each online user profile. The matching computing device may then compute a first sharing score between users A (owner) and C (renter), and a second sharing score between users B (owner) and C (renter). As stated above, users A and B each had the same base score of 9.5. However, when the matching computing device computes the sharing scores, the matching computing device may determine that the first sharing score (the sharing score between users A and C) may be lower than the second sharing score (the sharing score between users B and C). In this example, the difference among the first and the second sharing scores is due to the different baseballs teams that the users like. Because users A and C like different baseball teams and users B and C like the same baseball team, the sharing score of users A and C is lower than the score of users B and C.

In other examples, a sharing score may be higher or lower than others due to other elements (e.g., activities, hobbies, sports, careers, education, work place, place of residence, or the like) associated with online user profiles. In other words, the matching computing device may be configured to factor in the computation of sharing scores the compatibility of a variety of elements associated with the online user profiles.

In an alternative embodiment, the matching computing device may be configured to generate a sharing score between a user (e.g., an owner) and each item included in a user-listing associated with another user (e.g., a renter). In some embodiments, the matching computing device may be configured to generate a base score for each user (e.g., user base score) and/or a base score for each item in a user-listing (e.g., an item base score). In one embodiment, the matching computing device may be configured to generate a sharing score between the first user and each item included in the user-listing based upon the user base score and each item base score.

In another embodiment, the matching computing device may be configured to generate a sharing score between the first user and each item included in the user-listing based upon base scores and/or other data, such as insurance data, social media data, third party data, user data, or any other relevant data. For example, a first user may be looking to rent a vehicle, and a second user may have 3 separate vehicles listed for rent. The matching computing device may generate a sharing score between the first user and each of the 3 vehicles listed for rent by the second user based upon criteria set by the first user, base scores, and/or any other data associated with the two users. As a specific example, the first user may be looking for a car with room for multiple passengers, and the matching computing device may generate a lower sharing score for a 2-door sedan than for a mini-van, even though both vehicles are listed by the same user.

In the exemplary embodiment, the matching computing device may receive, from a client device via a computer application or a website, a rental request initiated by a renter (e.g., a registered user). The user may initiate the rental request by accessing the computer application or the website and sign into the matching system. Once the renter has signed into the matching system, the matching computing device is configured to collect data from the client device. For example, the matching computing device may collect data, such as a geolocation (e.g., global position system (GPS)) of the client device, a location input by the renter, duration of rental (e.g., pick up day(s) and time(s), drop off day(s) and time(s)), maximum and/or minimum distance from the geolocation of the client device or input location to search for available user-listings, maximum and/or minimum rental price, and/or other data that the matching computing device may request to operate, as described herein. The matching computing device may also be configured to send instructions to the client device to display filters (e.g., filter by vehicle make, vehicle type, distance, or the like) that may be input by the user.

In the exemplary embodiment, the matching computing device may compare the collected data to data stored in online user profiles, and generate sharing scores based upon the comparison, as described above. The matching computing device may also instruct the client device to display a list of one or more user-listings that match the collected data and the online user profile of the renter (e.g., renter profile).

A user may click on one of the user-listings triggering the client device to transmit a selection to the matching computing device. For example, a renter may initiate a rental request by inputting a filter, such as vehicle type (e.g., a pickup truck) into his client device. The client device transmits the rental request, including the filter, to the matching computing device. The matching computing device parses a database to perform a look up for online user profiles (e.g., owner profiles) including pickup trucks. Once the matching computing device collects the owner profiles, the matching computing device may generate a sharing score between each owner profile and the renter profile.

The matching computing device may also transmit to the client device instructions to display a list of the pickup trucks associated with the owner profiles and the sharing scores between the renter profile and each owner profile. In this example, the matching computing device instructs the client device to display a list of pickup trucks that may be selected by the renter. Once the renter clicks on one of the pickup trucks listed, the matching computing device transmits instructions to the client device to display, concurrently with the list, a dynamic map showing at least the location of the pickup truck and the sharing score between the owner profile of the pickup truck and the renter profile. In some embodiments, the sharing score is displayed as a range. In other embodiments, the sharing score is displayed as an integer or a decimal number.

In this example, the renter may click on the map to expand a view including details of the pickup truck (e.g., availability, location, or the like) and the owner profile (ratings, length in social media, or the like). Once the renter selects to rent a pickup truck, the client device transmits the selection to the matching computing device, which transmits, to a client device of the owner of the selected pickup truck, a request to rent the selected pickup truck. If the owner accepts the request, the matching computing device forwards the request to the renter's client device, and payment processing is initiated via an electronic marketplace associated with one or more social media servers, or using person-to-person payment process (e.g., from one account to another account).

Peer-to-peer commerce systems (also known as sharing economy systems) allow for the exchange of goods and/or services on an individual basis, so that individuals are exchanging the goods and/or services with other individuals. Examples of these exchanges, include but are not limited to online auctions, online classifieds, ride sharing, residence sharing, vehicle sharing, commute sharing, and travel sharing. In most sharing economy systems, a list of individuals that are willing to offer a service, such as a vehicle ride, vehicle rental, or a residence rental, list their proposed transaction on a website or other online platform. In one embodiment, an individual interested in renting (e.g., a renter) a good or service may advertise a demand to rent the good or service to multiple parties (e.g., multiple owners). Similarly, an individual interested in renting his or her own good or service may advertise an offer to rent the good or service to multiple parties (e.g., multiple renters).

At least one of the technical problems addressed by this system may include: (i) increasing the accessibility of stored data associated with a particular user; (ii) connecting users based upon a comprehensive set of data associated with each user; (iii) providing a particular, convenient aggregate of data useful to a user; (iv) providing a more efficient electronic marketplace platform by matching users together; and (v) generating improved and more targeted transactions by reducing user complaints, fraud, and bandwidth usage (e.g., less messaging traffic across the system).

The methods and systems described herein may be implemented using computer programming or engineering techniques including computer software, firmware, hardware, or any combination or subset thereof, wherein the technical effects may be achieved by performing at least one of the following steps: (i) generating a first online user profile associated with a first user, wherein the first online user profile comprises at least one of first insurance data, first social media data, first third party data, first user data, and first sharing data associated with a first user; (ii) generating a second online user profile associated with a second user, wherein the second online user profile comprises at least one of second insurance data, second social media data, second third party data, second user data, and second sharing data associated with a second user; (iii) calculating a first base score associated with the first user based upon the first online user profile, wherein the first base score represents a first level of trustworthiness of the first user; (iv) calculating a second base score associated with the second user based upon the second online user profile wherein the second base score represents a second level of trustworthiness of the second user; and (v) determining a sharing score between the first and second users based upon the first and second base scores, wherein the sharing score represents a level of matching between the first online user profile and the second online user profile.

Additionally or alternatively, the technical effects may be achieved by performing at least one of the following steps: (i) receiving a user-listing associated with a first user, wherein the user-listing includes a plurality of items offered for at least sale, rent, and lease, and wherein the first user is associated with a first user-type corresponding to an owner; (ii) calculating an item base score for each of the plurality of items, each item base score calculated based upon a first online user profile associated with the first user; (iii) calculating a second user base score based upon a second online user profile associated with a second user, wherein the second user is associated with a second user-type corresponding to a renter; and (iv) determining a sharing score between each of the plurality of items and the second user, wherein each sharing score is based upon each respective item base score and the second user base score, and wherein each sharing score represents a level of matching between each item and the second online user profile.

Exemplary Matching System

FIG. 1 depicts a view of an exemplary matching system 100 that may be used to build and update online user profiles, generate a base score for each online user profile, compare online user profiles, and generate sharing scores based upon the comparison. Matching system 100 may include matching computing device 102, which may be in communication with insurance provider server 104. In some embodiments, matching computing device 102 is a component of insurance provider server 104, while in others, matching computing device 102 is separate from insurance provider server 104. In the exemplary embodiment, matching computing device 102 is in further communication with client devices 106, third party servers 108 and social media servers 110. Matching computing device 102 is also in communication with database 112 and may communicate with database 112 through database server 114. In some embodiments, database server 114 is a component of insurance provider server 104. In other embodiments, database server 114 is separate from insurance provider server 104. In some embodiments, matching system 100 may include a plurality of matching computing devices, client devices, third party servers, social media servers, and/or databases.

In the exemplary embodiment, matching computing device 102 is configured to build, store, and update online user profiles. Matching computing device 102 may receive user data from client devices 106 and use the user data to register users and generate and update online user profiles. For example, a user may download a computer application to her client device (e.g., a user computing device) and input user data into the computer application for registration with the matching system. The user may also access a website of the matching system using a web browser, and input user data into the website to register with the matching system. The user data may include vehicle telematics, a user identifier, a user name, a user password, a client device IP address, user email address, user home address, user phone number, user financial account information, user vehicle information (e.g., vehicle make, model, type, year, license plate number, picture(s), feature(s), mileage, rental price, or the like) and/or other data associated with a vehicle of the user and/or the user.

User data may also include a user-type associated with the user, and may be selected by the user or automatically assigned by matching computing device 102. For example, a user registering with matching system 100 for the purpose of acquiring a rental car may select her user-type as "renter." As another example, a user registering with matching system 100 for the purpose of distributing a rental car may select her user-type as "owner." Additionally, user data may include user-listings which correspond to items (e.g., good(s) and/or service(s)) a user has listed or registered with matching system 100. For example, a user who would like to lease a car to another user may register her car as a user-listing. In some embodiments, multiple user-listings may be associated with a single user.

Matching computing device 102 may also receive sharing data from client devices 106 and may use the sharing data to update online user profiles. The sharing data may include data such as peer experience rating, experience comments, length of rental, and/or other sharing data that users may input regarding their experience while sharing a good and/or service through matching system 100. Matching computing device 102 may also compute historical sharing data, such as a number of times an user has requested to share and/or has shared a good and/or service, an overall peer experience rating (e.g., computing a rating based upon peer experience received), number of times an user has accepted and/or declined to share, and/or other historical sharing data that matching computing device 102 may compute based upon data associated with sharing experiences.

Matching computing device 102 may receive social media data from social media servers 110 and may use the social media data to register users and generate and update online user profiles. For example, a user may download a computer application to her client device (e.g., a user computing device) and access a social media site for registration with the matching system. The social media data may include a social media identifier, a social media name (e.g., FACEBOOK®, INSTAGRAM®, SNAPCHAT®, or other social network names), a user identifier, a user name, a number of followers and/or friends associated with each social media, liked pages, marketplace data, and/or other social media data associated with the user.

Matching computing device 102 may receive third party data from third party servers 108 and may use the third party data to generate and update online user profiles. For example, the matching computing device may receive credit score information from a third party server associated with a credit bureau agency (e.g., Experian®, TransUnion®, Equifax®) and update online user profiles accordingly. The third party data may include credit data (e.g., credit score, credit bureau identifier, user identifier, credit history, and/or other data associated with the credit information), public record data (e.g., public records available to the public, such as public offenses committed by users, an individual identifier, a type of offense, a time and date of offense, a place of offense, and/or other data associated with public records), vehicle history reports (e.g., CARFAX™ AUTOCHECK® by Experian, or the like) and/or other data that a third party may provide to the matching computing device.

Matching computing device 102 may further receive insurance data from insurance provider server 104 and may use the insurance data to generate and update online user profiles. For example, the matching computing device may receive an insurance claim from an insurance provider server associated with an insurance provider (e.g., State Farm®) and update online user profiles accordingly. The insurance data may include similar data points to the third party data, such as public record data and credit data, and the user data, such as vehicle telematics. The insurance data may also include insurance provider identifier, insurance type, insurance coverage, insurance tenure, insurance payment history, a number of insurance claims, insurance type of claims, insurance driving rating, background check, driver license number, driving record, telematics data, maintenance records, current tagged title, and/or other data that an insurance provider may provide to the matching computing device.

In the exemplary embodiment, matching computing device 102 uses the online user profiles to generate a base score for each online user profile, compare the online user profiles, and generate sharing scores based upon the comparison. Matching computing device 102 may be configured to compute a base score for each online user profile and store the base score with its corresponding online user profile. For example, matching computing device 102 may use any of user data, user type, social media data, insurance data, third party data, and/or sharing data to determine a base score. In some embodiments, matching computing device 102 determines the criteria for calculating a base score based upon any of the types of data described above. In other words, the equation used for calculating a user's base score may change based upon certain information included in that user's online user profile. For example, the base score for a user with user-type "renter" may be calculated using different data than the base score for a user with user-type "owner."

Matching computing device 102 may be configured to generate sharing scores between online user profiles based upon comparing online user profiles. Specifically, matching computing device 102 may compare data such as user data, insurance data, social media data, and sharing data contained in two different online user profiles and generate a sharing score between the two online user profiles based upon the comparison of the data. For example, matching computing device 102 may generate a sharing score between online user profile A and online user profile B by comparing insurance data, user preferences, and social media data contained in the two online user profiles. In one embodiment, matching computing device 102 includes base scores in the generation of a sharing score. Specifically, when an online user profile is created and updated, matching computing device 102 may generate a base score for the online user profile. Matching computing device 102 then compares at least two online user profiles, including the base scores and any of the data types listed above, and generates a sharing score between the two profiles. For example, matching computing device 102 may determine a first base score for a first online user profile and a second base score for a second online user profile. Matching computing device 102 may then compare the first online user profile and second online user profile by correlating social media data, insurance data, and base scores between the two online user profiles to determine a sharing score between these two online user profiles. In an alternative embodiment, matching computing device 102 may generate a sharing score between a first user and each item in a user-listing associated with a second user by comparing an online user profile associated with the first user and each item of the user-listing associated with a second online user profile.

Matching computing device 102 may receive user requests from client devices 106. Specifically, matching computing device 102 may receive requests to register a user within matching system 100, or may receive requests for initiating the matching process. For example, matching computing device 102 may receive a registration request from an user, register the user within matching system 100, collect additional user data from the user, and generate an online user profile. Matching computing device 102 may further receive a request from an user to initiate a matching process and may compare the user's online user profile with other online user profiles based upon the request.

Exemplary Database Configuration

Figure 2:
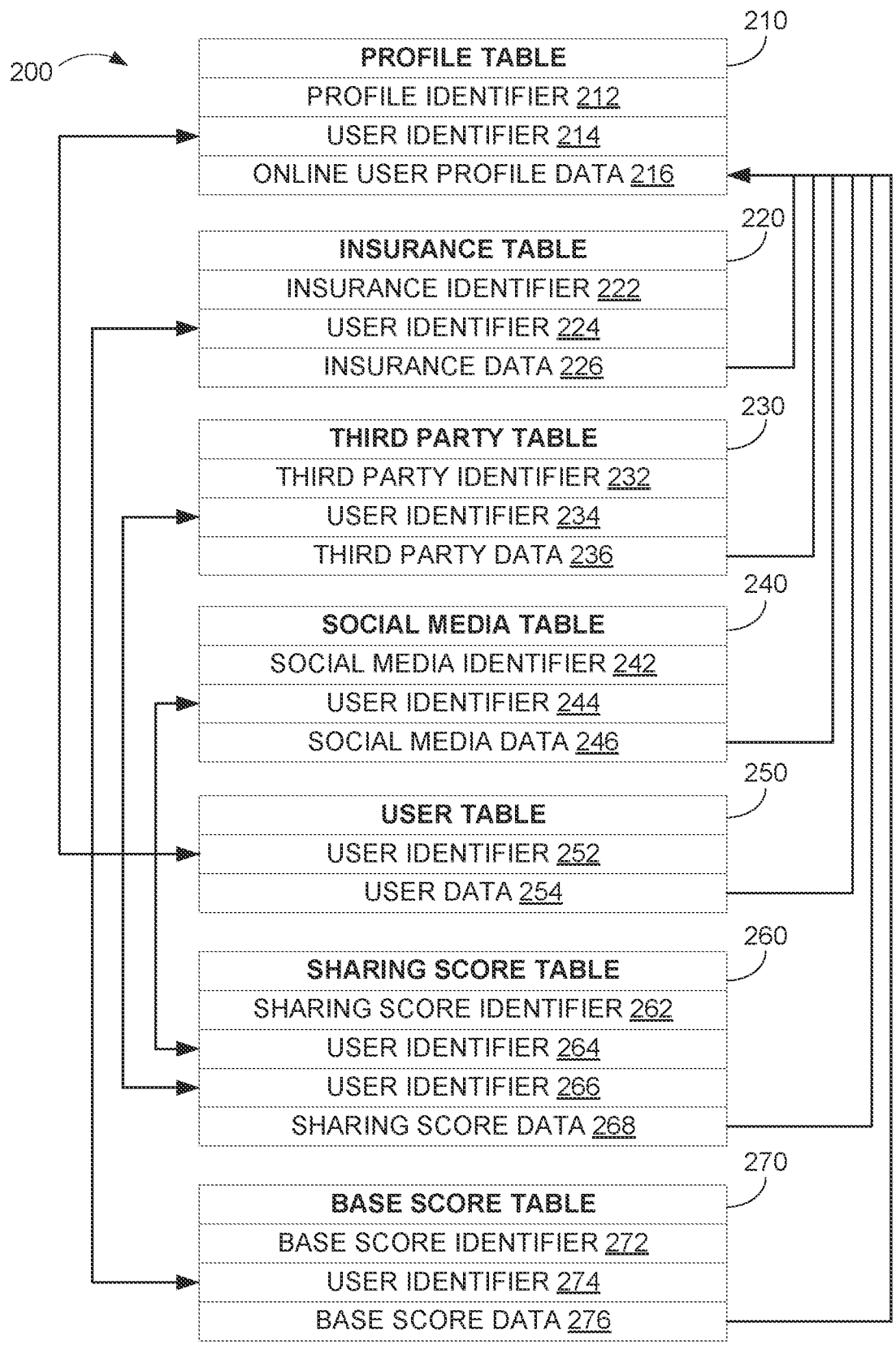
FIG. 2 illustrates is an exemplary configuration of a database used by the matching computer system shown in FIG. 1 for generating online user profiles.

FIG. 2 depicts an example configuration of a database 200 (similar to database 112 illustrated in FIG. 1) included in matching system 100 (shown in FIG. 1). Database 200 may include profile table 210, insurance table 220, third party table 230, social media table 240, user table 250, sharing score table 260, and base score table 270. Profile records in profile table 210 are uniquely identified by a profile identifier 212. Insurance records in insurance table 220 are uniquely identified by an insurance identifier 222. Third party records in third party table 230 are uniquely identified by a third party identifier 232. Social media records in social media table 240 are uniquely identified by a social media identifier 242. User records in user table 250 are uniquely identified by user identifier 252. Sharing score records in sharing score table 260 are uniquely identified by sharing score identifier 262. Base score records in base score table 270 are uniquely identified by base score identifier 272.

Matching computing device 102 (shown in FIG. 1) is configured to generate online user profile records. Specifically, matching computing device 102 is configured to generate online user profile records based upon online user profile data 216 and profile identifier 212 in profile table 210. In the exemplary embodiment, matching computing device 102 may transmit an instruction to database 200 such that database 200 generates online user profile data 216 by combining at least one of insurance data 226, third party data 236, social media data 246, user data 254, sharing score data 268, and base score data 276. In an alternative embodiment, matching computing device 102 generates online user profile data 216 by receiving and compiling insurance data 226, third party data 236, social media data 246, user data 254, sharing score data 268, and base score data 276. In the example embodiment, matching computing device 102 is configured to store online user profile data 216, corresponding profile identifier 212, and corresponding user identifier 214 in profile table 210. In the exemplary embodiment, matching computing device 102 utilizes user identifiers 214, 224, 234, 244, 252, 264, 266, and 274 to aggregate data in database 200 for a particular online user profile. In one example, user identifiers may be generated and assigned at the time of user registration.

Matching computing device 102 is also configured to generate insurance records, including insurance identifier 222, in insurance table 220 based upon insurance data 226 and user identifier 224. Additionally or alternatively, matching computing device 102 is configured to determine insurance identifier 222 based upon insurance data 226 associated with user identifier 224. In the example embodiment, matching computing device 102 is configured to store insurance data 226, corresponding insurance identifier 222, and user identifier 224 as records in insurance table 220.

Matching computing device 102 is also configured to generate third party records, including third party identifier 232, in third party table 230 based upon third party data 236 and user identifier 234. Additionally or alternatively, matching computing device 102 is configured to determine third party identifier 232 based upon third party data 236 associated with user identifier 234. In the example embodiment, matching computing device 102 is configured to store third party data 236, corresponding third party identifier 232, and user identifier 234 as records in third party table 230.

Matching computing device 102 is further configured to generate social media records, including social media identifier 242, in social media table 240 based upon social media data 246 and user identifier 244. Additionally or alternatively, matching computing device 102 is configured to determine social media identifier 242 based upon social media data 246 associated with user identifier 244. In the exemplary embodiment, matching computing device 102 is configured to store social media data 246, corresponding social media identifier 242, and user identifier 244 as records in social media table 240.

Matching computing device 102 is also configured to generate user records, including user identifier 252, in user table 250 based upon user data 256. Additionally or alternatively, matching computing device 102 is configured to determine user identifier 252 based upon user data 254. In the exemplary embodiment, matching computing device 102 is configured to store user data 254, and corresponding user identifier 252 as records in user table 250.

Matching computing device 102 is further configured to generate sharing score records, including sharing score identifier 262, in sharing score table 260 based upon sharing score data 268, user identifier 264, and user identifier 266. In the exemplary embodiment, matching computing device 102 may determine a sharing score between two different users corresponding to user identifiers 264 and 266; sharing score data 268 may be associated with both users and included in each user's online user profile. Additionally or alternatively, matching computing device 102 is configured to determine user identifiers 264 and 266 based upon sharing score data 268 associated with user identifiers 264 and 266. In the exemplary embodiment, matching computing device 102 is configured to store sharing score data 268, corresponding sharing score identifier 262, and corresponding user identifiers 264 and 266 as records in sharing score table 260.

Matching computing device 102 may be further configured to generate base score records, including base score identifier 272, in base score table 270 based upon base score data 276 and user identifier 274. In the exemplary embodiment, matching computing device 102 may determine a base score for an user corresponding to user identifier 274; base score data 276 may be associated with the user and included in the user's online user profile. Additionally or alternatively, matching computing device 102 is configured to determine base score identifier 272 based upon base score data 276 associated with user identifier 274. In the example embodiment, matching computing device 102 is configured to store base score data 276, corresponding base score identifier 272, and corresponding user identifier 274 as records in base score table 270.

Database 200 is configured to receive queries, and generate query responses. In some embodiments, queries include any combination of profile identifier 212, insurance identifier 222, third party identifier 232, social media identifier 242, user identifier 252, sharing score identifier 262, and base score identifier 272. Additionally or alternatively, queries may include ranges and/or rules for selecting identifiers. Database 200 is configured to filter profile records (e.g., online user profile data 216) based upon the query, and generate a query response including the filtered data. For example, database 200 may generate a query response including base score data 276 corresponding to a particular user associated with user identifier 274 included in the query.

Exemplary User Computer Device

Figure 3:
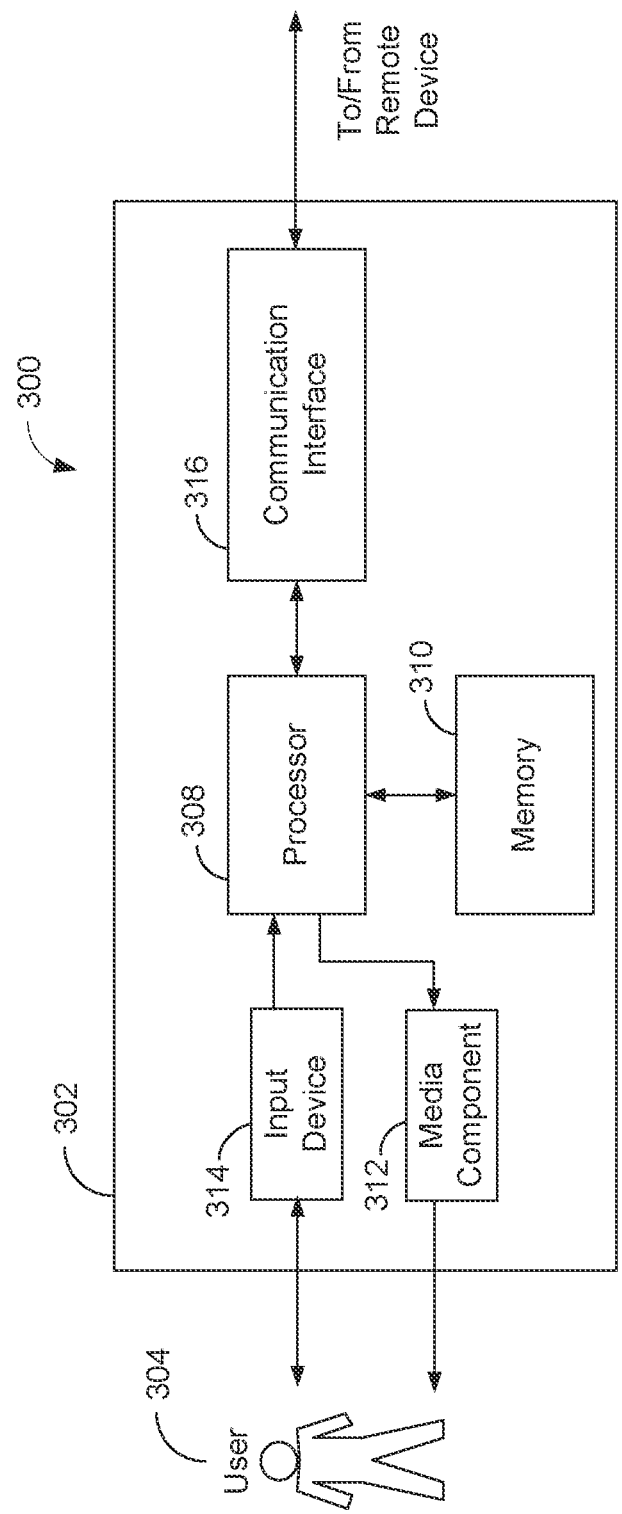
FIG. 3 illustrates an exemplary configuration of an exemplary user computing device that may be used in the matching computer system illustrated in FIG. 1.

FIG. 3 illustrates an exemplary configuration 300 of an exemplary user computing device 302. In some embodiments, user computing device 302 may be in communication with a matching computing device (such as matching computing device 102, shown in FIG. 1). User computing device 302 may be representative of, but is not limited to client devices 106, third party servers 108, social media servers 110, and/or insurance provider server 104. For example, user computing device 302 may be a smartphone, tablet, smartwatch, wearable electronic, laptop, desktop, vehicle computing device, or another type of computing device associated with the account holder.

User computer device 302 may be operated by a user 304 (e.g., a user of matching system 100, shown in FIG. 1). User computer device 302 may receive input from user 304 via an input device 314. User computer device 302 includes a processor 308 for executing instructions. In some embodiments, executable instructions may be stored in a memory area 310. Processor 308 may include one or more processing units (e.g., in a multi-core configuration). Memory area 310 may be any device allowing information such as executable instructions and/or transaction data to be stored and retrieved. Memory area 310 may include one or more computer-readable media.

User computer device 302 also may include at least one media output component 312 for presenting information to user 304. Media output component 312 may be any component capable of conveying information to user 304. In some embodiments, media output component 312 may include an output adapter (not shown), such as a video adapter and/or an audio adapter. An output adapter may be operatively coupled to processor 308 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 312 may be configured to present a graphical user interface (e.g., a web browser and/or a client application) to user 304. A graphical user interface may include, for example, social insurance group activity, and/or a wallet application for managing payment information such as cash and/or cryptocurrency payment methods.

In some embodiments, user computer device 302 may include input device 314 for receiving input from user 304. User 304 may use input device 314 to, without limitation, interact with matching system 100 (e.g., using an app), matching computing device 102, or any of insurance provider server 104, client devices 106, third party servers 108, and social media servers 110 (shown in FIG. 1). Input device 314 may include, for example, a keyboard, a pointing device, a mouse, a stylus, and/or a touch sensitive panel (e.g., a touch pad or a touch screen). A single component, such as a touch screen, may function as both an output device of media output component 312 and input device 314. User computer device 302 may further include at least one sensor, including, for example, a gyroscope, an accelerometer, a position detector, a biometric input device, a telematics data collection device, and/or an audio input device. In some embodiments, at least some data collected by user computer device 302 may be transmitted to insurance provider 112. In the exemplary embodiment, data collected by user computer device 302 may be included in online user profiles.

User computer device 302 may also include a communication interface 316, communicatively coupled to any of matching computing device 102, insurance provider server 104, client devices 106, third party servers 108, and social media servers 110. Communication interface 316 may include, for example, a wired or wireless network adapter and/or a wireless data transceiver for use with a mobile telecommunications network.

Stored in memory area 310 may be, for example, computer-readable instructions for providing a user interface to user 304 via media output component 312 and, optionally, receiving and processing input from input device 314. The user interface may include, among other possibilities, a web browser and/or a client application. Web browsers enable users, such as user 304, to display and interact with media and other information typically embedded on a web page or a website hosted by insurance provider server 106 and/or user computing device 302. A client application may allow user 304 to interact with, for example, any of matching computing device 102, insurance provider server 104, client devices 106, third party servers 108, and social media servers 110. For example, instructions may be stored by a cloud service and the output of the execution of the instructions sent to the media output component 312.

Exemplary Server Device

Figure 4:
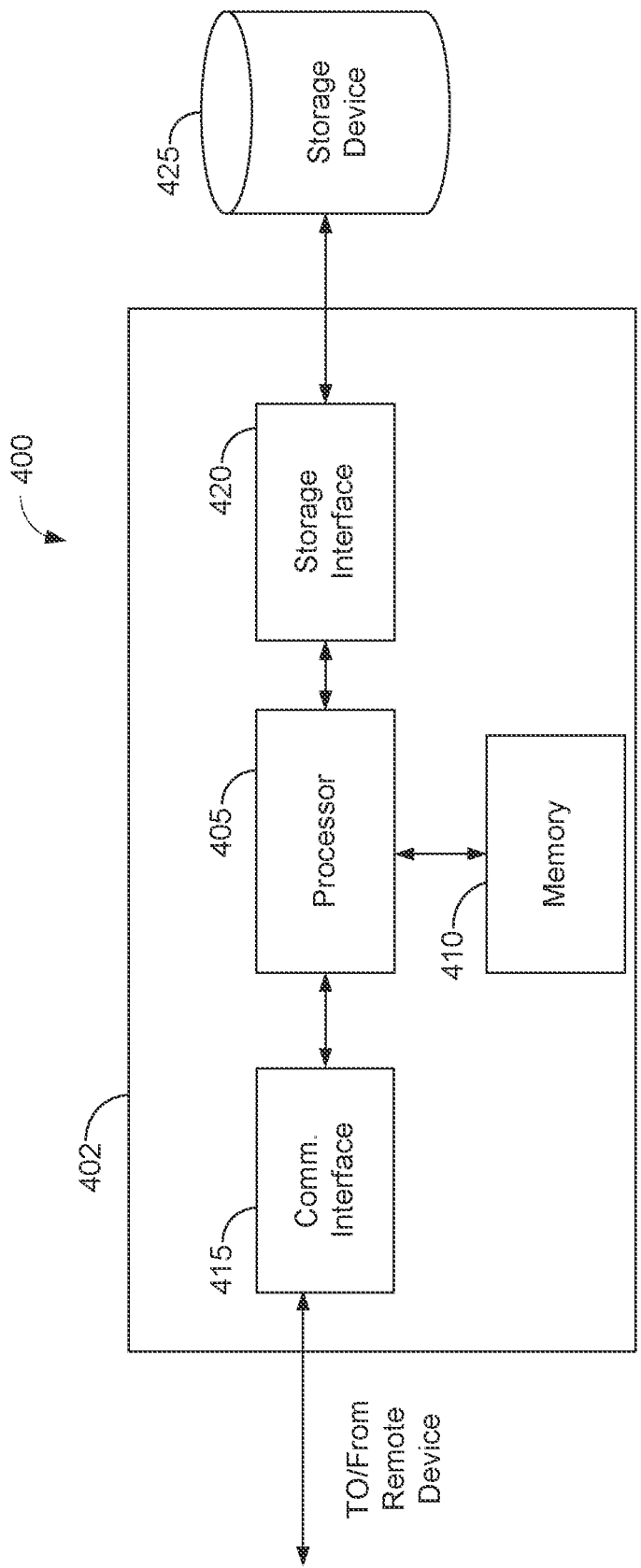
FIG. 4 illustrates an exemplary configuration of an exemplary server computing device that may be used in the matching computer system illustrated in FIG. 1.

FIG. 4 depicts an exemplary configuration 400 of an exemplary server computing device 402, in accordance with one embodiment of the present disclosure. Server computer device 402 may include, but is not limited to, matching computing device 102 (shown in FIG. 1). Server computer device 402 may include a processor 405 for executing instructions. Instructions may be stored in a memory area 410. Processor 405 may include one or more processing units (e.g., in a multi-core configuration).

Processor 405 may be operatively coupled to a communication interface 415 such that server computer device 402 may be capable of communicating with a remote device such as another server computer device 402 or a user computing device, such as user computing device 302 (shown in FIG. 3). For example, communication interface 415 may receive requests from or transmit requests to user computing device 302 via the Internet.

Processor 405 may also be operatively coupled to a storage device 425. Storage device 425 may be any computer-operated hardware suitable for storing and/or retrieving data, such as, but not limited to, data associated with database 112 (shown in FIG. 1). In some embodiments, storage device 425 may be integrated in server computer device 402. For example, server computer device 402 may include one or more hard disk drives as storage device 425. In other embodiments, storage device 425 may be external to server computer device 402 and may be accessed by a plurality of server computer devices 402. For example, storage device 425 may include a storage area network (SAN), a network attached storage (NAS) system, and/or multiple storage units such as hard disks and/or solid state disks in a redundant array of inexpensive disks (RAID) configuration.

In some embodiments, processor 405 may be operatively coupled to storage device 420 via a storage interface 420. Storage interface 420 may be any component capable of providing processor 405 with access to storage device 420. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 420.

Processor 405 executes computer-executable instructions for implementing aspects of the disclosure. In some embodiments, processor 405 may be transformed into a special purpose microprocessor by executing computer-executable instructions or by otherwise being programmed.

Exemplary Graphical User Interface

Figure 5:
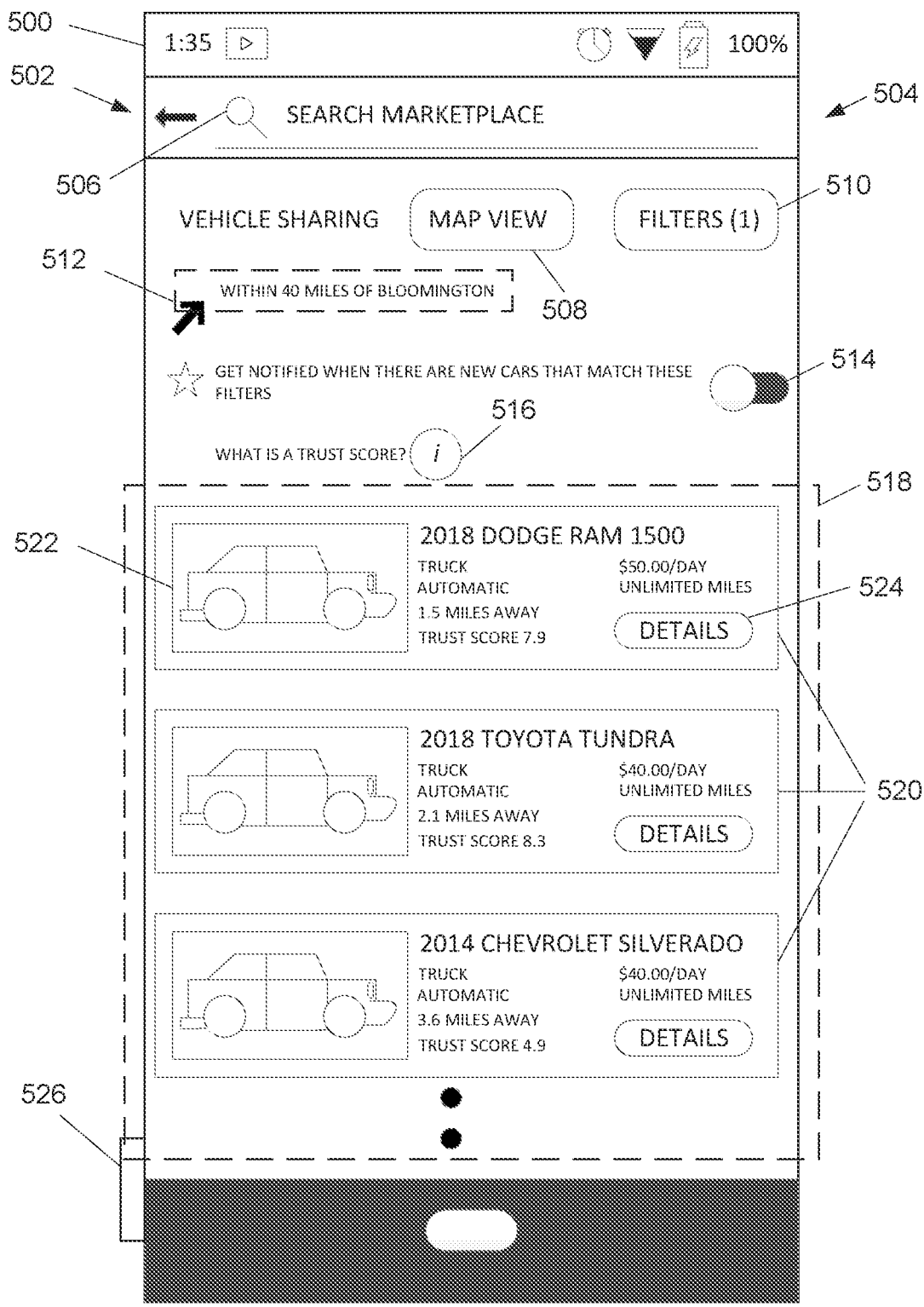
FIG. 5 illustrates an exemplary graphical user interface of a computer application implemented by the matching computer system shown in FIG. 1.

FIG. 5 illustrates graphical user interface ("GUI") 502 presented on user computing device 500. GUI 502 may be generated and transmitted by matching computing device 102 (shown in FIG. 1) and may provide a means for a user to input user data, view other online user profiles, and/or access sharing scores calculated between the user and another user. User computing device 500 includes communication interface 526, which allows user computing device 500 to receive and transmit data wirelessly or through wires. In some embodiments, the GUI 502 may be integrated in a social media website, and the GUI 502 may display the potential flow from a renter's perspective when looking for a vehicle to rent, with renters and vehicle owners be best matched via a sharing score algorithm or determination.

GUI 502 is configured to display list page 504. List page 504 displays search results to a "searching user." In the exemplary embodiment, search results include user-listings associated with a "listing user." In some embodiments, search results may include any data associated with the user and/or other online user profiles, such as user data, insurance data, third party data, social media data, base scores, and/or sharing scores. For example, search results may take the form of vehicles listed for rent by other users. As another example, search results may show cars and additional user data such as a base score and/or a sharing score. In yet another example, search results may show other types of data other than user-listings, such as a user profile that matches a name searched by a user.

List page 504 includes search bar 506, which allows the searching user to input search terms and search for data containing those search terms. Specifically, a searching user may enter search terms, and matching computing device 102 may search database 112 (shown in FIG. 1) for profiles that include data matching the search term. For example, a user may input the search term "Toyota Corolla." List page 504 may subsequently display a list of items that match the term "Toyota Corolla." List page 504 also includes map view link 508, which causes GUI 502 to display map page 604 (shown in FIG. 6). In an alternative embodiment, map view link 506 causes GUI 502 to display a map including search results as a component of list page 504. List page 504 also includes filters 510, which allow the user to include or exclude search results based upon certain criteria. List page 504 also displays current filters 512, which indicate criteria set by the user through filters 510. List page 504 also includes notifications toggle 514, which allows the user to toggle automatic notifications on and off, and information button 516, which displays additional information to the user.

In the exemplary embodiment, list page 504 includes results list 518. Results list 518 may contain one or more search results 520. Search results 520 are items associated with online user profiles that match criteria set in filters 510, search terms entered in search bar 506, and/or other criteria set by a searching user in his/her online user profile. In the exemplary embodiment, search results 520 are user-listings that match criteria set by the searching user. For example, search results 520 may include a plurality of rental cars listed as "for rent" (e.g., rental listing). Further, based upon user preferences or filters set by the searching user, list page 504 may display only certain rental cars in search results 520 that match specific criteria, such as "fewer than 30,000 miles" or "no prior accidents." In some embodiments, results list 518 may contain no search results. For example, if no rental listings match user-input criteria, there may be no search results to display.

Matching computing device 102 may generate search results 520, transmit search results 520 to user computing device 500, and instruct user computing device 500 to display search results 520 through GUI 502. Search results 520 may include data gathered from online user profiles of listing users (e.g., owner profiles of owners), such as insurance data, user data, third party data, and social media data. Further, search results 520 may include data calculated from the above referenced data, such as a base score calculated for an owner profile, a sharing score calculated between a searching user (e.g., a renter) and a listing user, and/or a sharing score calculated between the searching user and each item included in a user-listing associated with a listing user. Any of the above referenced data may be compiled by matching computing device 102 and displayed in search results 520.

In the exemplary embodiment, search results 520 contain more data than is displayed on list page 504. In other words, search results 520 are presented such that certain information, such as a sharing score, is displayed on list page 504, but other information related to the search result 520 is not presented visually. For example, GUI 502 may display search results 520 such that an image of the user-listing along with the base score of the listing user is displayed; however, when search results 520 are generated, additional data such as user-data and insurance data associated with search results 520 are not displayed. This aggregation of search results 520 and certain data associated with search results 520 provides a convenient, understandable interface for a searching user to locate user-listings that match her criteria.

In the exemplary embodiment, list page 504 also includes result image 522 and details 524. Each search result 520 may include a result image 522 and details 524. List page 504 allows a user to select the result image 522 or details 524 in order to receive more information about search result 520. Specifically, a user may select the result image 522 and/or details 524, causing GUI 502 to display listing user profile page 704 (see FIG. 7). In another embodiment, selecting result image 522 and/or details 524 causes GUI 502 to display details page 804 (see FIG. 8). In yet another embodiment, selecting result image 522 and/or details 524 causes GUI 502 to display additional information within list page 504.

Exemplary Graphical User Interface

Figure 6:
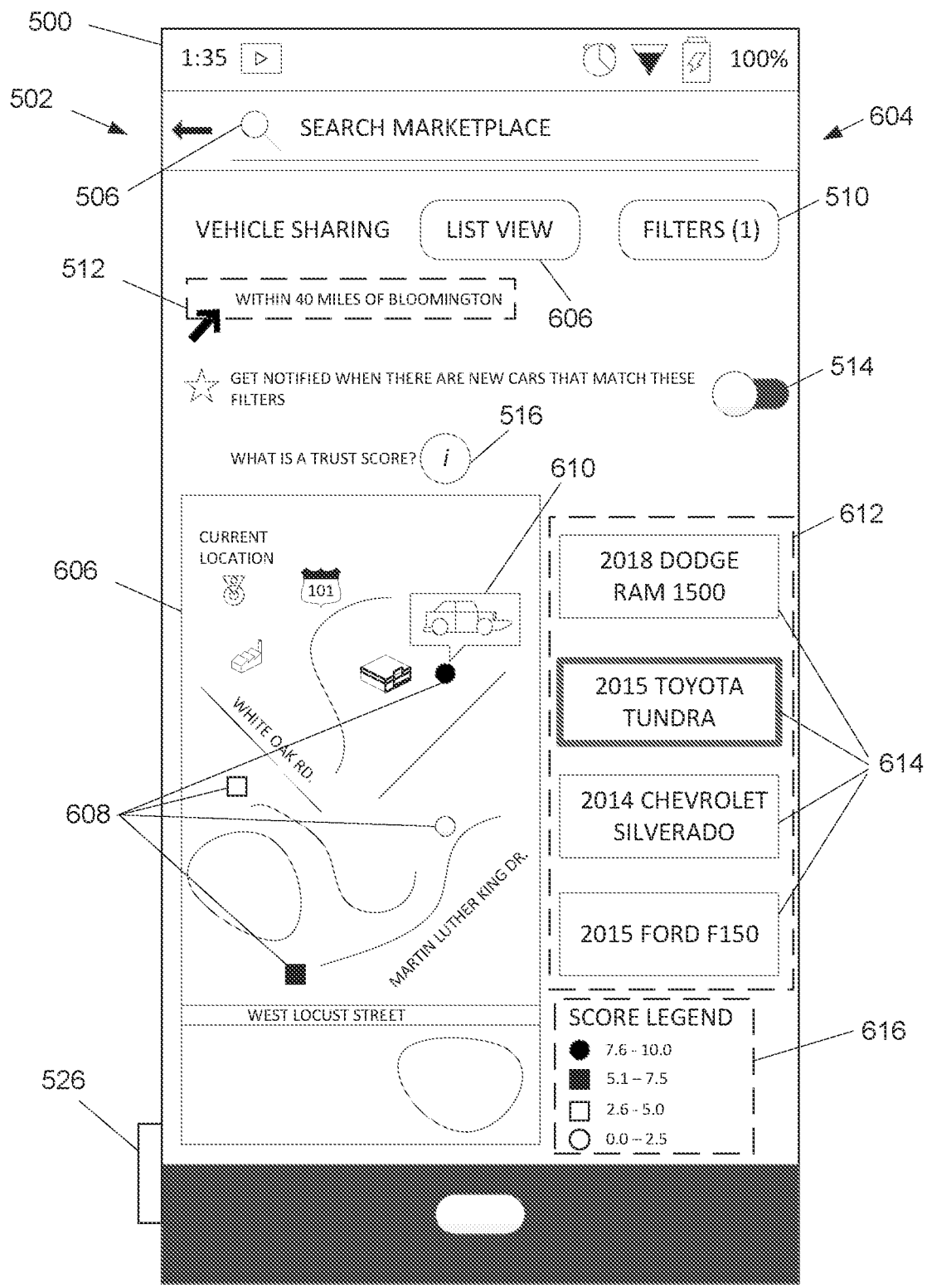
FIG. 6 illustrates an exemplary graphical user interface of a computer application implemented by the matching computer system shown in FIG. 1.

FIG. 6 illustrates graphical user interface ("GUI") 502 presented on user computing device 500. GUI 502 may be generated and transmitted by matching computing device 102 (shown in FIG. 1) and may provide a means for a user to input user data, view other online user profiles, and/or access sharing scores calculated between the user and an another user. User computing device 500 includes communication interface 526, which allows user computing device 500 to receive and transmit data wirelessly or through wires. In one embodiment, GUI 502 may again be a view from the renter's perspective, and once a renter selects the vehicle he or she wishes to use, they are able to view availability, location, and vehicle owners profile for user feedback, etc. From here, the vehicle owner and renter may agree on pick up and drop off locations and times.

GUI 502 is configured to display map page 604. Map page 604 displays search results to a "searching user." In the exemplary embodiment, search results include user-listings associated with a "listing user." In some embodiments, search results may include any data associated with the user or other online user profiles, such as user data, insurance data, third party data, social media data, base scores, and/or sharing scores. For example, search results may take the form of vehicles listed for rent by other users. As another example, search results may show vehicles and additional user data such as a base score and/or a sharing score. In yet another example, search results may show other types of data other than user-listings, such as an online user profile that matches a name searched by a user.

Map page 604 includes search bar 506, which allows a searching user to input search terms and search for data containing those search terms. Specifically, a searching user may enter search terms, and matching computing device 102 may search database 112 (shown in FIG. 1) for profiles that include data matching the search term. For example, a user might enter the search term "Toyota Corolla" and map page 604 may subsequently display a map of items that match the term "Toyota Corolla." Map page 604 also includes list view link 606, which causes GUI 502 to display list page 504 (shown in FIG. 5). In an alternative embodiment, list view link 606 causes GUI 502 to display a list including search results as a component of map page 604.

Map page 604 also includes filters 510, which allows the user to include or exclude search results based upon certain criteria. Map page 604 also displays current filters 512, which indicate criteria set by the user through filters 510. Map page 604 also includes notifications toggle 514, which allows a user to toggle automatic notifications on and off, and information button 516, which displays additional information to a user.

In the exemplary embodiment, map page 604 includes results list 612. Results list 612 may contain one or more search results 614. Search results 614 are items related to online user profiles that match criteria set in filters 510, search terms entered in search bar 506, and/or other criteria set by a searching user in his/her online user profile. In the exemplary embodiment, search results 614 are user-listings that match criteria set by the searching user. For example, search results 614 may include a plurality of rental cars listed by listing users as "for rent." Further, based upon user preferences or filters set by the searching user, map page 604 may display only certain rental cars in search results 614 that match specific criteria, such as "fewer than 30,000 miles" or "no prior accidents." In some embodiments, results list 612 may contain no search results. For example, if no rental listings match user-input criteria, there may be no search results to display.

Matching computing device 102 may generate search results 614, transmit search results 614 to user computing device 500, and instruct user computing device 500 to display search results 614 through GUI 502. Search results 614 may contain data gathered from online user profiles of listing users, such as insurance data, user data, third party data, and social media data. Further, search results 614 may contain data calculated based upon the above referenced data, such as a base score calculated for a listing user and/or a sharing score calculated between the searching user and a listing user. Any of the above referenced data may be compiled by matching computing device 102 and displayed in search results 614. In the exemplary embodiment, search results 614 contain more data than is displayed on map page 604. In other words, search results 614 are presented such that certain information, such as vehicle make and model, is displayed on map page 604, but other information related to the search results 614 is not presented visually. This aggregation of search results 614 and certain data associated with search results 614 provides a convenient, understandable interface for a searching user to locate user-listings that match her criteria.

In the exemplary embodiment, map page 604 includes results map 606, which includes search results 614 overlaid on a map. Specifically, a result icon 608 is assigned to each search result 614, and result icons 608 are visually overlaid on a map. Matching computing device 102 (shown in FIG. 1) may generate results map 606 by determining search results 614, determining a location associated with each search result 614, assigning a result icon 608 to each search result 614, and overlaying result icons 608 on a map based upon the locations of search results 614. Results map 606 may be configured to display results image 610 associated with one of the search results 614. Map page 604 may be configured to display results image 610 upon user selection of one of search icons 608.

In another embodiment, map page 604 may be configured to display results image 610 upon user selection of one of the search results 614 from search list 612. In the exemplary embodiment, map page 604 may accept user input which causes results map 606 to scroll, move, enlarge, shrink, zoom, rotate, or otherwise change the location and/or orientation of the area displayed by results map 606.

In the exemplary embodiment, result icons 608 may have a certain appearance based upon data stored in search results 614. In other words, based upon attributes of search result 614, the corresponding result icon 608 will be assigned a certain appearance. For example, search results with a sharing score above a certain value may be assigned a result icon that is a red square. In another example, search results with a base score below a certain value may be assigned a result icon that is a green circle. In another example, search results that match particular user-defined criteria may be assigned a result icon that is a gold star.

Map page 604 includes score legend 616, which displays the criteria for determining the appearance of the result icons. In other words, score legend 616 allows the user to understand what the different result icons 608 indicate. By associating search results 614 with result icons 608 and accurately locating result icons 608 on a map, map page 604 provides a convenient, understandable way for a user to view user-listings available in a particular geographical area.

In one embodiment, user selection of results image 610, results icons 608, and/or search results 614 may cause GUI 502 to display user profile page 704 (see FIG. 7), details page 804 (see FIG. 8), or additional information within map page 604.

Exemplary Graphical User Interface

Figure 7:
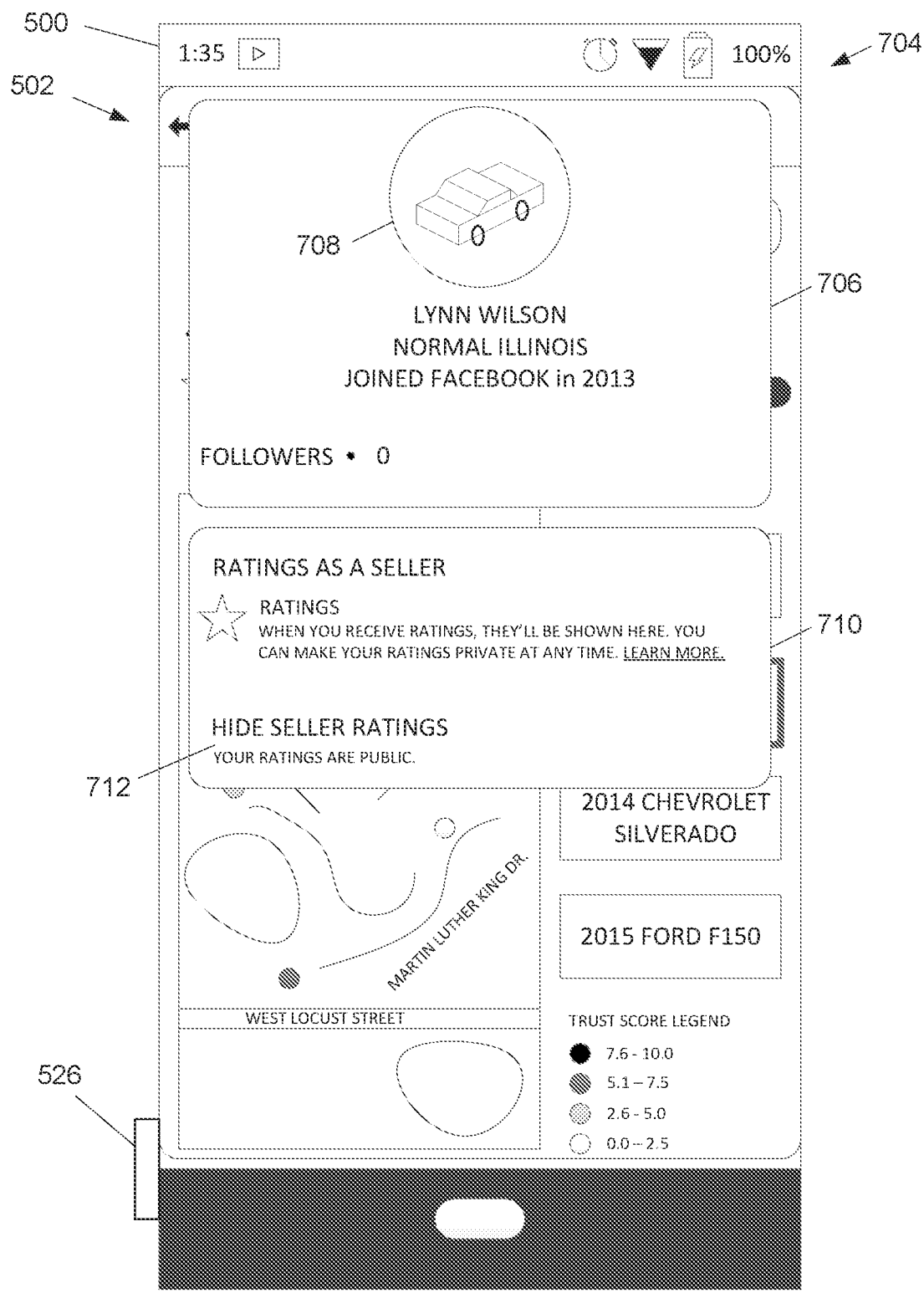
FIG. 7 illustrates an exemplary graphical user interface of a computer application implemented by the matching computer system shown in FIG. 1.

FIG. 7 illustrates graphical user interface ("GUI") 502 presented on user computing device 500. GUI 502 may be generated and transmitted by matching computing device 102 (shown in FIG. 1) and may provide a means for a user to input user data, view other online user profiles, and/or access sharing scores calculated between the user and an another user. User computing device 500 includes communication interface 526, which allows user computing device 500 to receive and transmit data wirelessly or through wires.

GUI 502 is configured to display user profile page 704. User profile page 704 contains information about a user, such as user data, insurance data, social media data, third party data, base scores, and/or sharing scores associated with a user. In one embodiment, a "searching user" may access a user profile page associated with a "listing user" by selecting that listing user or a search result associated with the listing user. For example, a searching user may select a rental car from search results list 520 (shown in FIG. 5) and be directed to a user profile page associated with the listing user who owns the rental car. In another embodiment, a searching user may access his/her own profile page. In one embodiment, user profile page 704 is a separate page generated by GUI 502 and displayed to a user. In another embodiment, user profile page 704 is generated by GUI 502 and overlaid on another interface page, such as list page 504 or map page 604 (shown in FIGS. 5 and 6 respectively).

User profile page 704 includes online user profile 706. Online user profile 706 may include and display information about a user, such as user data, insurance data, social media data, third party data, and/or base scores associated with a user. In the exemplary embodiment, online user profile 706 may also include a sharing score between a first user viewing profile 706 and a second user associated with online user profile 706. Matching computing device 102 (shown in FIG. 1) may generate online user profile 706 based upon information received from database 112 (shown in FIG. 1).

Online user profile 706 may also include one or more user-listings, such as user-listing 708. User-listing 708 includes an item or service listed by the user and may be the search result that caused online user profile 706 to be displayed to the searching user. In some embodiments, online user profile 706 includes a plurality of user-listings 708. Online user profile 706 may also include a sharing score between a first user viewing profile 706 and each user listing 708 associated with profile 706. In some embodiments, user listing 708 can be selected by the searching user, causing the GUI to generate and display list page 504, map page 604, or details page 804.

User profile page 704 may include additional information 710, which may include any of the possible data for 706, as well as additional information not directly associated with the listing user. For example, additional information 710 may include a sharing score or a seller rating. In another example, additional information 710 may include a general notice to all users. Additional information 710 may also include preferences option 712, which allows a user to set certain preferences associated with his/her user profile page 704. For example, a user may set preferences which hide certain information from other users.

Exemplary Graphical User Interface

Figure 8:
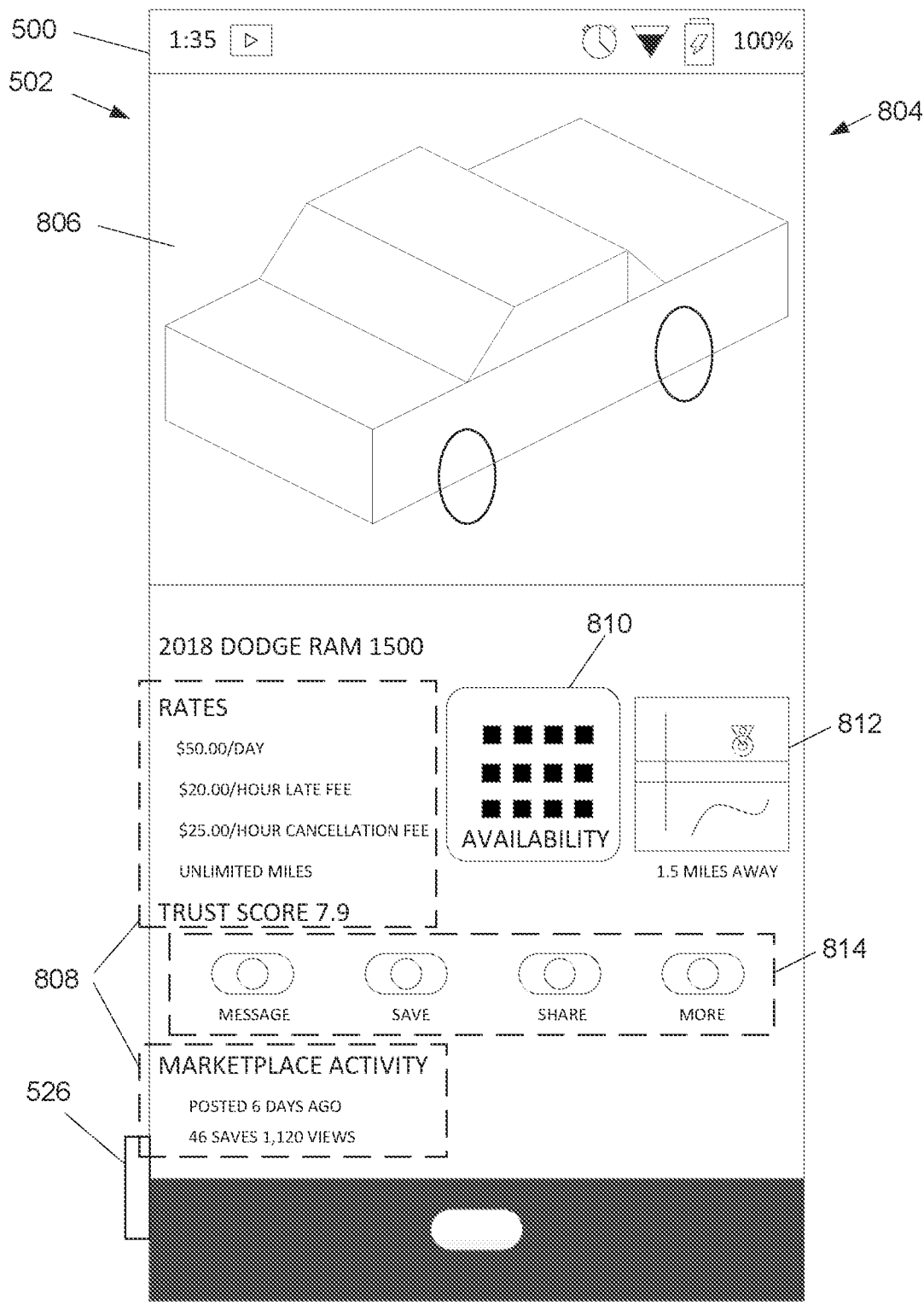
FIG. 8 illustrates an exemplary graphical user interface of a computer application implemented by the matching computer system shown in FIG. 1.

FIG. 8 illustrates graphical user interface ("GUI") 502 presented on user computing device 500. GUI 502 may be generated and transmitted by matching computing device 102 (shown in FIG. 1) and may provide a means for a user to input user data, view other online user profiles, and/or access sharing scores calculated between the user and an another user. User computing device 500 includes communication interface 526, which allows user computing device 500 to receive and transmit data wirelessly or through wires.

GUI 502 is configured to display details page 804. Details page 804 includes additional information and actions associated with a particular search result, such as search results 520 and 614 (shown in FIGS. 5 and 6 respectively). In the exemplary embodiment, search results include user-listings associated with a "listing user." In some embodiments, search results may include any data associated with the user or other online user profiles, such as user data, insurance data, third party data, social media data, base scores, and/or sharing scores. For example, search results may take the form of cars listed for rent by other users. As another example, search results may show cars and additional user data such as a base score and/or a sharing score. In yet another example, search results may show other types of data other than user-listings, such as an online user profile that matches a name searched by a user.

In one embodiment, details page 804 contains item image 806, which contains an image of a search result selected by a searching user. In some embodiments, item image 806 contains multiple images associated with a search result, and a user is able to scroll through multiple images. For example, item image 806 may be an image of a car listed for rent by a listing user. Further, a user may be able to swipe or navigate through multiple images of the car.

In one embodiment, details page 804 also includes listing information 808. Matching computing device 102 may generate listing information 808 based upon data received from database 112 (shown in FIG. 1). Listing information 808 may include any data associated with a search result. In the exemplary embodiment, the item listed is a rental car, and the listing information 808 includes rates for renting the car, a sharing score between the searching user and the listing user, and marketplace activity of the listing user. Listing information 808 may include any combination of available data.

In the exemplary embodiment, details page 804 also includes availability link 810. A user may select availability link 810, causing GUI 502 to generate and display additional information regarding the availability of the listing. For example, availability link 810 might cause GUI 502 to display a listing of dates which a rental car is available for rental. In one embodiment, availability link 810 may cause GUI 502 to redirect the user to an additional page which details the availability of the item. In another embodiment, availability link 810 may cause GUI 502 to display availability information within details page 804.

In the exemplary embodiment, matching computing device 102 may associate listing information 808 with availability link 810, such that data displayed through listing information 808 may depend on dates specified via availability link 810. Specifically, details page 804 may allow a user to select at least one date through availability link 810 and may update listing information 808 based upon the date selection. For example, a user may select a date via availability link 810, and details page may update listing information score 808 such that displayed rates reflect the rates for the specific date selected by the user.

In the exemplary embodiment, details page 804 also includes map link 812. A user may select map link 812, causing GUI 502 to generate and display additional information regarding the location of the listing. In one embodiment, map link 812 causes GUI 502 to redirect the user to map page 604. In another embodiment, map link 812 may cause GUI 502 to display additional location information within details page 804. For example, map link 812 may cause GUI 502 to display a map which visually indicates the location of the vehicle.

In the exemplary embodiment, details page 804 also includes additional actions 814. A user may select one of additional actions 814, causing GUI 502 to generate and display a field for taking additional actions. For example, selecting an additional action called "message" may bring up a field for typing and sending a message to the "listing user" who posted the listing. As another example, an additional action called "share" may bring up a field for typing in a message and selecting a recipient for the message and a link to the listing page. As another example, an additional action called "more" may display a list of further options the user can select from.

In another embodiment, selecting one of additional actions 814 causes GUI 502 to carry out a response. For example, selecting an additional action called "save" may cause GUI 502 to download the listing to a storage device local to user computing device 500 or may cause matching computing device 102 to save the listing in database 112.

Exemplary Computer-Implemented Method

Figure 9:
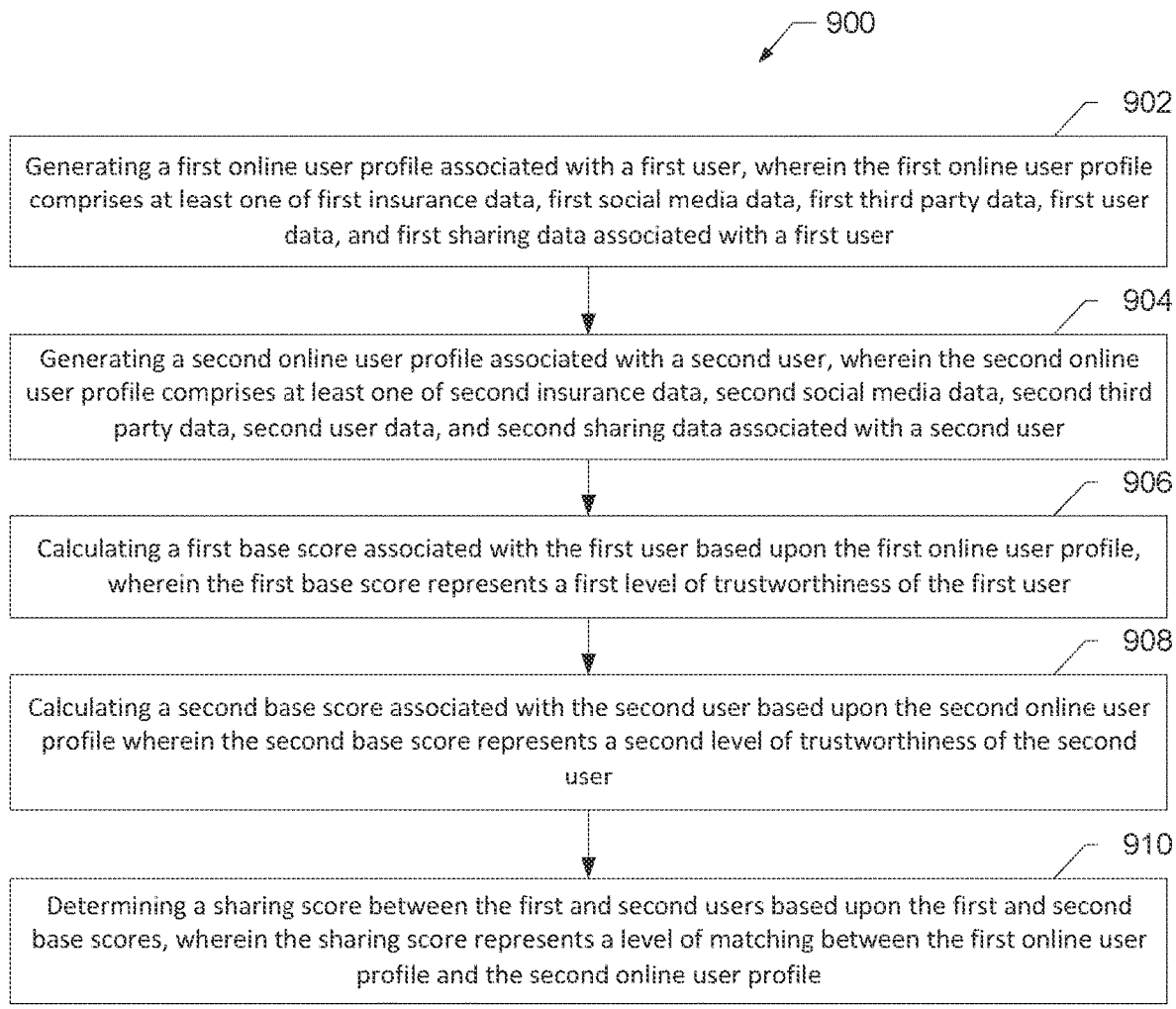
FIG. 9 illustrates a flow chart of an exemplary computer-implemented method implemented by the exemplary matching computer system shown in FIG. 1.

FIG. 9 depicts a flow chart illustrating a computer-implemented method 900 for determining a sharing score between online user profiles. In the exemplary embodiment, method 900 may be implemented by a matching computer system such as matching computer system 100 (shown in FIG. 1), and more specifically, by a matching computing device 102 (shown in FIG. 1).

Method 900 may include generating 902 a first online user profile associated with a first user, wherein the first online user profile comprises at least one of first insurance data, first social media data, first third party data, first user data, and first sharing data associated with a first user. Method 900 may also include generating 904 a second online user profile associated with a second user, wherein the second online user profile comprises at least one of second insurance data, second social media data, second third party data, second user data, and second sharing data associated with a second user.

Method 900 may further include calculating 906 a first base score associated with the first user based upon the first online user profile, wherein the first base score represents a first level of trustworthiness of the first user. Method 900 may additionally include calculating 908 a second base score associated with the second user based upon the second online user profile wherein the second base score represents a second level of trustworthiness of the second user. Method 900 may also include determining 910 a sharing score between the first and second users based upon the first and second base scores, wherein the sharing score represents a level of matching between the first online user profile and the second online user profile.

Exemplary Computer Device

Figure 10:
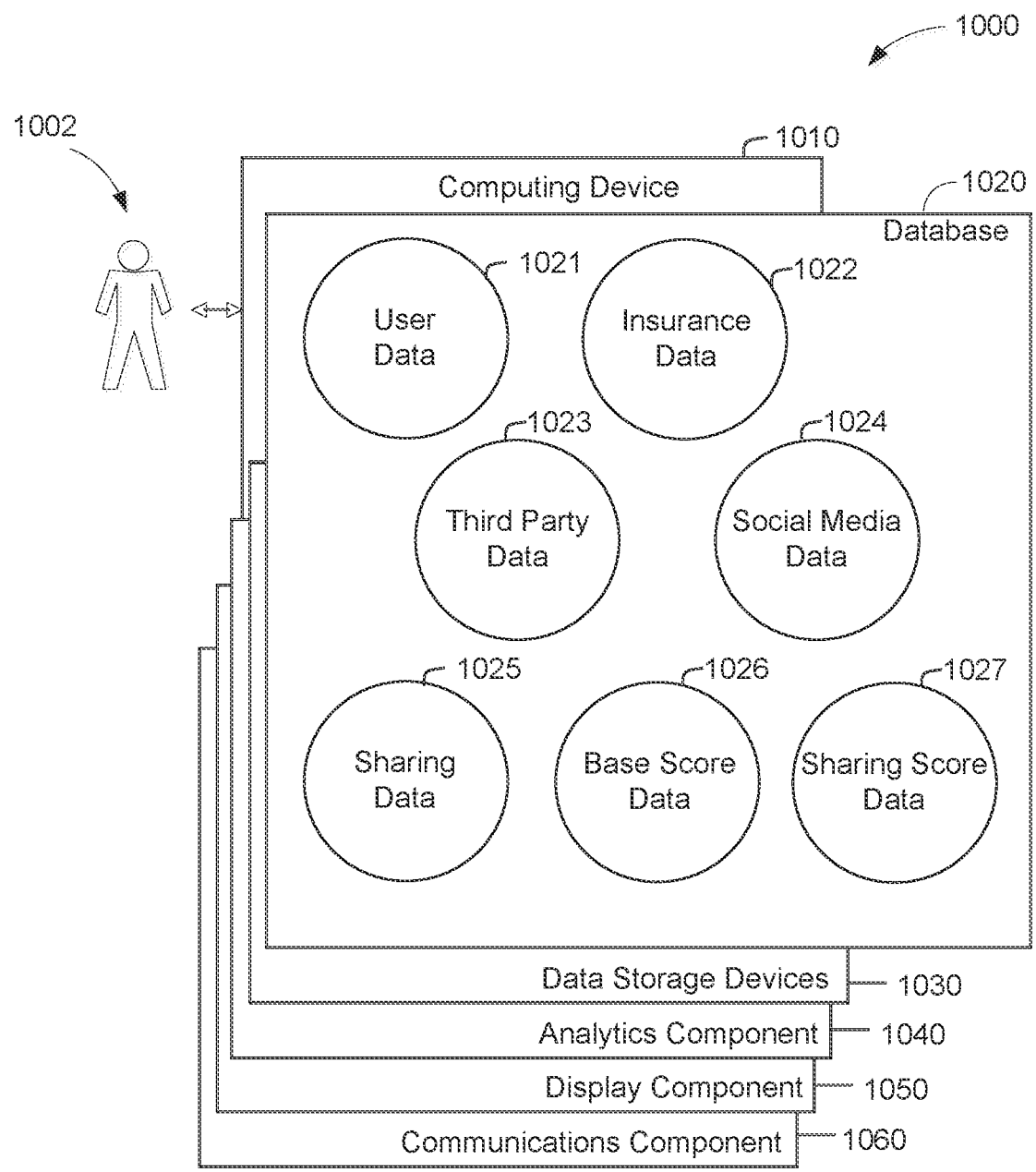
FIG. 10 illustrates a diagram of components of one or more exemplary computing devices that may be used in the matching computer system shown in FIG. 1.

FIG. 10 depicts a diagram 1000 of components of one or more exemplary computing devices 1010 that may be used in matching system 100 (shown in FIG. 1). In some embodiments, computing device 1010 may be similar to matching computing device 102 (shown in FIG. 1). Database 1020 may be coupled with several separate components within computing device 1010, which perform specific tasks. In this embodiment, database 1020 may include user data 1021, insurance data 1022, third party data 1023, social media data 1024, sharing data 1025, base score data 1026, and sharing score data 1027. In some embodiments, database 1020 is similar to database 112 (shown in FIG. 1).

Computing device 1010 may include the database 1020, as well as data storage devices 1030. Computing device 1010 may also include an analytics component 1040 for generating online user profiles 902, 904, calculating base scores 906, 908, and determining sharing scores 910 (all shown in FIG. 9). Computing device 1010 may further include display component 1050 for generating and displaying a graphical user interface, such as GUI 502 (shown in FIGS. 5-8). Moreover, computing device 1010 may include communications component 1060 for receiving and transmitting data, such as user data 1021, insurance data 1022, third party data 1023, social media data 1024, sharing data 1025, base score data 1026, and sharing score data 1027.

Exemplary Embodiments & Functionality

The present embodiments may relate to systems and methods for determining a sharing score between online user profiles. The system may include a matching computing device, one or more insurance provider servers, one or more client systems, one or more social media servers, one or more third party servers, and/or one or more databases, as described above.

In one aspect, a matching computer system for determining a sharing score between online user profiles is provided. The matching computer system may include at least one processor in communication with at least one memory device. The at least one processor may be configured to: (i) generate a first online user profile associated with a first user, wherein the first online user profile comprises at least one of first insurance data, first social media data, first third party data, first user data, and first sharing data associated with a first user; (ii) generate a second online user profile associated with a second user, wherein the second online user profile comprises at least one of second insurance data, second social media data, second third party data, second user data, and second sharing data associated with a second user; (iii) calculate a first base score associated with the first user based upon the first online user profile, wherein the first base score represents a first level of trustworthiness of the first user; (iv) calculate a second base score associated with the second user based upon the second online user profile wherein the second base score represents a second level of trustworthiness of the second user; and/or (v) determine a sharing score between the first and second users based upon the first and second base scores, wherein the sharing score represents a level of matching between the first online user profile and the second online user profile. The matching computer system may include additional, less, or alternate functionality, including that discussed elsewhere herein.

For instance, one enhancement may be where the at least one processor may be further configured to: (i) receive a first user-type associated with the first user and a second user-type associated with the second user; (ii) calculate the first base score based upon the first user-type; and/or (iii) calculate the second base score based upon the second user-type.

Another enhancement may be where the at least one processor may be further configured to: generate a graphical user interface, wherein the graphical user interface is configured to: (i) display the first base score and the second base score; and/or (ii) display the sharing score between the first user and the second user.

In another aspect, a matching computer system for determining a sharing score between online user profiles is provided. The matching computer system may include at least one processor in communication with at least one memory device. The at least one processor may be configured to: (i) receive a user-listing associated with a first user, wherein the user-listing includes a plurality of items offered for at least sale, rent, and lease, and wherein the first user is associated with a first user-type corresponding to an owner; (ii) calculate an item base score for each of the plurality of items, each item base score calculated based upon a first online user profile associated with the first user; (iii) calculate a second user base score based upon a second online user profile associated with a second user, wherein the second user is associated with a second user-type corresponding to a renter; and/or (iv) determine a sharing score between each of the plurality of items and the second user, wherein each sharing score is based upon each respective item base score and the second user base score, and wherein each sharing score represents a level of matching between each item and the second online user profile. The matching computer system may include additional, less, or alternate functionality, including that discussed elsewhere herein.

For instance, one enhancement may be where the user-listing includes listing availability dates and listing rates associated with the listing availability dates.

Another enhancement may be where the at least one processor may be further configured to: generate a graphical user interface, wherein the graphical user interface is configured to: (i) display the user-listing associated with the first user; (ii) receive a first selection input from the second user, the first selection input indicating at least one selected item from the user-listing; and/or (iii) display, in response to receiving the first selection input, the sharing score between the at least one selected item and the second user.

Another enhancement may be where the at least one processor may be further configured to generate a graphical user interface, wherein the graphical user interface is configured to: (i) display, in response to receiving the first selection input, at least one listing availability date and the associated listing rate; (ii) receive a second selection input from the second user, the second selection input indicating an available date; and/or (iii) concurrently display a location on a map of the at least one selected item and details associated with the at least one selected item.

Another enhancement may be where the at least one processor may be further configured to: generate a graphical user interface, wherein the graphical user interface is configured to display the user-listing and each determined sharing score between each of the plurality of items and the second user.

Another enhancement may be where the plurality of items includes at least one of goods and services.

In another aspect, a computer-implemented method for determining a sharing score between online user profiles is provided. The method may be implemented by a matching computer system including at least one processor. The method may include: (i) generating a first online user profile associated with a first user, wherein the first online user profile comprises at least one of first insurance data, first social media data, first third party data, first user data, and first sharing data associated with a first user; (ii) generating a second online user profile associated with a second user, wherein the second online user profile comprises at least one of second insurance data, second social media data, second third party data, second user data, and second sharing data associated with a second user; (iii) calculating a first base score associated with the first user based upon the first online user profile, wherein the first base score represents a first level of trustworthiness of the first user; (iv) calculating a second base score associated with the second user based upon the second online user profile wherein the second base score represents a second level of trustworthiness of the second user; and/or (v) determining a sharing score between the first and second users based upon the first and second base scores, wherein the sharing score represents a level of matching between the first online user profile and the second online user profile. The method may include additional, less, or alternate actions, including those discussed elsewhere herein.

For instance, one enhancement may be where the computer-implemented method may further include: (i) receiving a first user-type associated with the first user and a second user-type associated with the second user; (ii) calculating the first base score based upon the first user-type; and/or (iii) calculating the second base score based upon the second user-type.

A further enhancement may be where the computer-implemented method may further include: generating a graphical user interface, wherein the graphical user interface is configured to: (i) display the first base score and the second base score; and/or (ii) display the sharing score between the first user and the second user.

In another aspect, a computer-implemented method for determining a sharing score between online user profiles is provided. The method may be implemented by a matching computer system including at least one processor. The method may include: (i) receiving a user-listing associated with a first user, wherein the user-listing includes a plurality of items offered for at least sale, rent, and lease, and wherein the first user is associated with a first user-type corresponding to an owner; (ii) calculating an item base score for each of the plurality of items, each item base score calculated based upon a first online user profile associated with the first user; (iii) calculating a second user base score based upon a second online user profile associated with a second user, wherein the second user is associated with a second user-type corresponding to a renter; and/or (iv) determining a sharing score between each of the plurality of items and the second user, wherein each sharing score is based upon each respective item base score and the second user base score, and wherein each sharing score represents a level of matching between each item and the second online user profile. The method may include additional, less, or alternate actions, including those discussed elsewhere herein.

For instance, one enhancement may be where the user-listing includes listing availability dates and listing rates associated with the listing availability dates.

A further enhancement may be where the computer-implemented method may further include: generating a graphical user interface, wherein the graphical user interface may be configured to: (i) display the user-listing associated with the first user; (ii) receive a first selection input from the second user, the first selection input indicating at least one selected item from the user-listing; and/or (iii) display, in response to receiving the first selection input, the sharing score between the at least one selected item and the second user.

A further enhancement may be where the computer-implemented method may further include: generating a graphical user interface, wherein the graphical user interface may be configured to: (i) display, in response to receiving the first selection input, at least one listing availability date and the associated listing rate; (ii) receive a second selection input from the second user, the second selection input indicating an available date; and/or (iii) concurrently display a location on a map of the at least one selected item and details associated with the at least one selected item.

A further enhancement may be where the computer-implemented method may further include generating a graphical user interface, wherein the graphical user interface is configured to display the user-listing and each determined sharing score between each of the plurality of items and the second user.

In another aspect, at least one non-transitory computer-readable storage media having computer-executable instructions embodied thereon for determining a sharing score between online user profiles is provided. When executed by at least one processor, the computer-executable instructions may cause the processor to: (i) receive a user-listing associated with a first user, wherein the user-listing includes a plurality of items offered for at least sale, rent, and lease, and wherein the first user is associated with a first user-type corresponding to an owner; (ii) calculate an item base score for each of the plurality of items, each item base score calculated based upon a first online user profile associated with the first user; (iii) calculate a second user base score based upon a second online user profile associated with a second user, wherein the second user is associated with a second user-type corresponding to a renter; and/or (iv) determine a sharing score between each of the plurality of items and the second user, wherein each sharing score is based upon each respective item base score and the second user base score, and wherein each sharing score represents a level of matching between each item and the second online user profile. The instructions may direct additional, less, or alternate functionality, including that discussed elsewhere herein.

For instance, one enhancement may be where the computer-executable instructions may further cause the processor to: (i) receive a first user-type associated with the first user and a second user-type associated with the second user; (ii) calculate the first base score based upon the first user-type; and/or (iii) calculate the second base score based upon the second user-type.

Another enhancement may be where the computer-executable instructions may further cause the processor to: generate a graphical user interface, wherein the graphical user interface is configured to: (i) display the first base score and the second base score; and/or (ii) display the sharing score between the first user and the second user.

In another aspect, at least one non-transitory computer-readable storage media having computer-executable instructions embodied thereon for determining a sharing score between online user profiles is provided. When executed by at least one processor, the computer-executable instructions may cause the processor to: (i) generate a first online user profile associated with a first user, wherein the first online user profile comprises at least one of first insurance data, first social media data, first third party data, first user data, and first sharing data associated with a first user; (ii) generate a second online user profile associated with a second user, wherein the second online user profile comprises at least one of second insurance data, second social media data, second third party data, second user data, and second sharing data associated with a second user; (iii) calculate a first base score associated with the first user based upon the first online user profile, wherein the first base score represents a first level of trustworthiness of the first user; (iv) calculate a second base score associated with the second user based upon the second online user profile wherein the second base score represents a second level of trustworthiness of the second user; and (v) determine a sharing score between the first and second users based upon the first and second base scores, wherein the sharing score represents a level of matching between the first online user profile and the second online user profile. The instructions may direct additional, less, or alternate functionality, including that discussed elsewhere herein.

For instance, one enhancement may be where the user-listing includes listing availability dates and listing rates associated with the listing availability dates.

Another enhancement may be where the computer-executable instructions may further cause the processor to: generate a graphical user interface, wherein the graphical user interface is configured to: (i) display the user-listing associated with the first user; (ii) receive a first selection input from the second user, the first selection input indicating at least one selected item from the user-listing; and/or (iii) display, in response to receiving the first selection input, the sharing score between the at least one selected item and the second user.

Another enhancement may be where the computer-executable instructions may further cause the processor to: generate a graphical user interface, wherein the graphical user interface is configured to: (i) display, in response to receiving the first selection input, at least one listing availability date and the associated listing rate; (ii) receive a second selection input from the second user, the second selection input indicating an available date; and/or (iii) concurrently display a location on a map of the at least one selected item and details associated with the at least one selected item.

Another enhancement may be where the computer-executable instructions may further cause the processor to: generate a graphical user interface, wherein the graphical user interface is configured to display the user-listing and each determined sharing score between each of the plurality of items and the second user.

Another enhancement may be where the plurality of items includes at least one of goods and services.

Machine Learning & Other Matters

The computer systems and computer-implemented methods discussed herein may include additional, less, or alternate actions and/or functionalities, including those discussed elsewhere herein. The computer systems may include or be implemented via computer-executable instructions stored on non-transitory computer-readable media. The methods may be implemented via one or more local or remote processors, transceivers, servers, and/or sensors (such as processors, transceivers, servers, and/or sensors mounted on mobile computing devices, or associated with smart infrastructure or remote servers), and/or via computer executable instructions stored on non-transitory computer-readable media or medium.

In some embodiments, a matching computing device is configured to implement machine learning, such that the matching computing device "learns" to analyze, organize, and/or process data without being explicitly programmed. Machine learning may be implemented through machine learning methods and algorithms ("ML methods and algorithms"). In an exemplary embodiment, a machine learning module ("ML module") is configured to implement ML methods and algorithms. In some embodiments, ML methods and algorithms are applied to data inputs and generate machine learning outputs ("ML outputs"). Data inputs may include but are not limited to: user data, third party data, social media data, insurance data, sharing data, base score data, and/or sharing score data. ML outputs may include but are not limited to: sharing data, base score data, sharing score data, search results, and/or mapped search results. In some embodiments, data inputs may include certain ML outputs.

In some embodiments, at least one of a plurality of ML methods and algorithms may be applied, which may include but are not limited to: linear or logistic regression, instance-based algorithms, regularization algorithms, decision trees, Bayesian networks, cluster analysis, association rule learning, artificial neural networks, deep learning, dimensionality reduction, and support vector machines. In various embodiments, the implemented ML methods and algorithms are directed toward at least one of a plurality of categorizations of machine learning, such as supervised learning, unsupervised learning, and reinforcement learning.

In one embodiment, the ML module employs supervised learning, which involves identifying patterns in existing data to make predictions about subsequently received data. Specifically, the ML module is "trained" using training data, which includes example inputs and associated example outputs. Based upon the training data, the ML module may generate a predictive function which maps outputs to inputs and may utilize the predictive function to generate ML outputs based upon data inputs. The example inputs and example outputs of the training data may include any of the data inputs or ML outputs described above. For example, a ML module may receive training data comprising social media data, insurance data, and a base score associated with the social media data and insurance data. The ML module may then generate a model which maps base scores to aspects of social media data and insurance data. The ML module may then generate base scores as a ML output based upon subsequently received social media data and insurance data.

In another embodiment, an ML module may employ unsupervised learning, which involves finding meaningful relationships in unorganized data. Unlike supervised learning, unsupervised learning does not involve user-initiated training based upon example inputs with associated outputs. Rather, in unsupervised learning, the ML module may organize unlabeled data according to a relationship determined by at least one ML method/algorithm employed by the ML module. Unorganized data may include any combination of data inputs and/or ML outputs as described above. For example, a ML module may receive unlabeled data comprising user data, social media data, and sharing scores between users. The ML module may employ an unsupervised learning method such as "clustering" to identify patterns and organize the unlabeled data into meaningful groups. The newly organized data may be used, for example, to generate a model which associates user data and social media data to sharing scores.

In yet another embodiment, a ML module may employ reinforcement learning, which involves optimizing outputs based upon feedback from a reward signal. Specifically, the ML module may receive a user-defined reward signal definition, receive a data input, utilize a decision-making model to generate a ML output based upon the data input, receive a reward signal based upon the reward signal definition and the ML output, and alter the decision-making model so as to receive a stronger reward signal for subsequently generated ML outputs. The reward signal definition may be based upon any of the data inputs or ML outputs described above. For example, a ML module may implement reinforcement learning in generating sharing scores between users. The ML module may utilize a decision-making model to generate sharing scores between users based upon base scores and social media data, and may further receive user-satisfaction data indicating a level of satisfaction experienced by two users who engaged in a transaction. A reward signal may be generated by comparing the user-satisfaction data to the sharing score between the two users. Based upon the reward signal, the ML module may update the decision-making model such that subsequently generated sharing scores more accurately predict user satisfaction.

Exemplary P2P Rental Vehicle Transaction

Figure 11:
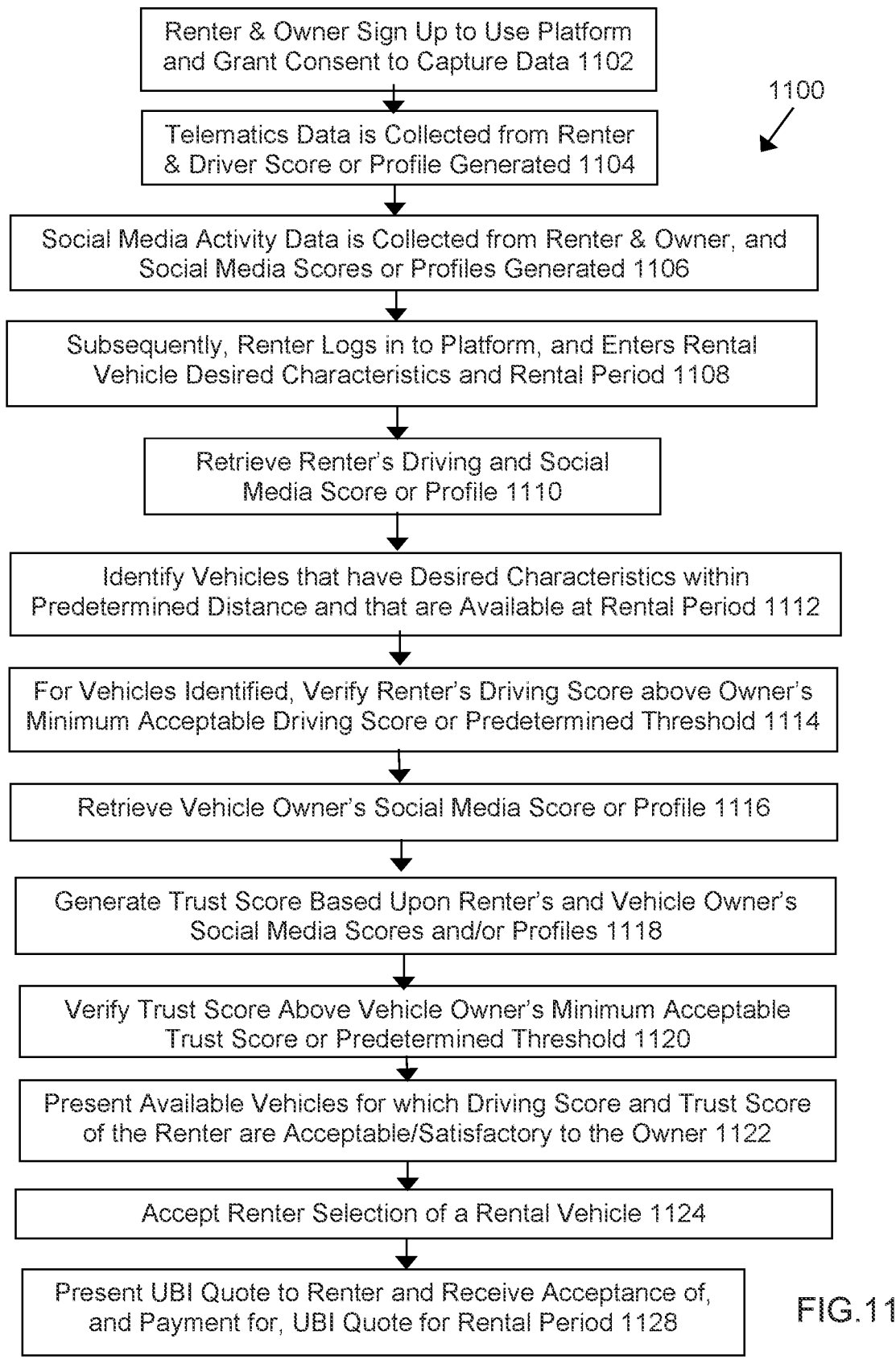
FIG. 11 illustrates an exemplary computer-implemented method of conducting a P2P rental vehicle transaction.

FIG. 11 illustrates an exemplary computer-implemented method of conducting a P2P rental vehicle transaction 1100. The computer-implemented method 1100 may be conducted by one or more local or remote processors, servers, transceivers, and/or sensors, and/or directed by computer executable instructions stored on non-transitory computer readable media or medium.

The method 1100 may include (vehicle or other types of) renters and (vehicle or other types of) owners signing up to use a sharing platform, server, or website via their mobile devices or other computing devices 1102. The renters and owners may each provide affirmative consent or permission for a remote server to gather or collect various types of data, such as telematics data, insurance data, credit score data, social media data, social media activity data, and other types of data, including those discussed elsewhere herein. The permission to collect data may be received, via one or more processors, transceivers, and/or remote servers, and via wireless communication or data transmission from mobile devices.

The method 1100 may include, via one or more processors, transceivers, and/or remote servers (and via wireless communication or data transmission from mobile devices, for example), collecting telematics data for each renter or prospective renter, and generating a risk or driver score or risk or driving profile for each renter based upon the telematics data 1104. The telematics data may include cornering, braking, speed, acceleration, deceleration, location, heading, route, following distance information, time-of-day, and other types of telematics data associated with driving behavior of the renter.

The method 1100 may include, via one or more processors, transceivers, and/or remote servers (and via wireless communication or data transmission from mobile devices, for example), collecting social media data and/or social media activity data for each renter or prospective renter, and generating a social media score or profile for each renter based upon the social media or social media activity data 1104. The social media or social media activity data may include parameters or factors discussed elsewhere herein, such as likes or dislikes, number of online friends, how long the users have been on a social media platform, number of posts, the degree to which the dependent people are connected and history on the marketplace, etc. The method 1100 may also include computing a trust score based upon the generated social media score.

The method 1100 may include, the renter subsequently logging into the platform or website, and via one or more processors, transceivers, and/or remote servers (and via wireless communication or data transmission from mobile devices, for example), entering the desired characteristics of a rental items, in this case, a rental vehicle 1108. The rental vehicle characteristics may include make, model, year, color, etc. The renter may also enter a rental period and desired amount to pay 1108.

The method 1100 may include, via one or more processors, transceivers, and/or remote servers, retrieving the renter's driving or driver score or profile and/or the renter's social media score or profile 1110 from a memory unit.

The method 1100 may include, via one or more processors, transceivers, and/or remote servers, identifying rental vehicles that have the renter's desired characteristics within a predetermined distance, and that are available during or at the rental period 1112.

The method 1100 may include, via one or more processors, transceivers, and/or remote servers, for each rental vehicle that possesses the renter's desired characteristics, verifying or checking that the renter's driving score is above or meets the vehicle owner's minimum acceptable or satisfactory driving score or otherwise meets a predetermined threshold or driving score 1114.

The method 1100 may include, via one or more processors, transceivers, and/or remote servers, for each vehicle that matches the renter's desired characteristics and for which the renter's or driver's score is acceptable to the owner, retrieving the vehicle owner's social media score or profile 1116 from a memory unit.

The method 1100 may include, via one or more processors, transceivers, and/or remote servers, for each vehicle that matches the renter's desired characteristics and for which the renter's or driver's score is acceptable to the owner, generating a trust score based upon the renter's and the owner's social media or social media score or profiles 1118.

The method 1100 may include, via one or more processors, transceivers, and/or remote servers, for each vehicle that matches the renter's desired characteristics and for which the renter's or driver's score is acceptable to the owner, verifying that the trust score is above the vehicle owner's minimum acceptable trust score or otherwise meets a predetermined trust threshold 1120.

The method 1100 may include, via one or more processors, transceivers, and/or remote servers (and via wireless communication or data transmission to mobile devices, for example), for each vehicle that matches the renter's desired characteristics and for which the renter's or driver's score is acceptable to the owner, and for which the renter/owner trust score is above or meets a minimum acceptable trust score, presenting those vehicles on the user interface of the platform or website for viewing available rental vehicles by the renter on their mobile device or other computing device 1122.

The method 1100 may include, via one or more processors, transceivers, and/or remote servers (and via wireless communication or data transmission from mobile devices, for example), receiving or accepting a renter's selection of an individual rental vehicle 1124.

The method 1100 may include, via one or more processors, transceivers, and/or remote servers, generating a UBI (usage-based insurance) quote or UBI auto insurance quote for the rental vehicle. The UBI quote may be based upon vehicle characteristics (such as year, make, model), the renter's driving score or profile (determined from telematics data), and/or the renter's social media score or profile.

The method 1100 may include, via one or more processors, transceivers, and/or remote servers, presenting the UBI quote to the renter via wireless communication or data transmission to their mobile device, and receiving acceptance of, and/or electronic payment for, the UBI quote and/or UBI for the rental period and covering/insuring the rental vehicle 1128.

The method 1100 may include, via one or more processors, transceivers, and/or remote servers, and via wireless communication or data transmission from a renter's mobile device, feedback on the owner and the owner's vehicle. The feedback may be used to adjust the vehicle owner's and/or the vehicle's profile for presentation to future potential renters using the platform or website. The method 1100 may include additional, less, or alternate actions, including those discussed elsewhere herein.

Exemplary P2P Rental Home Transaction

Figure 12:
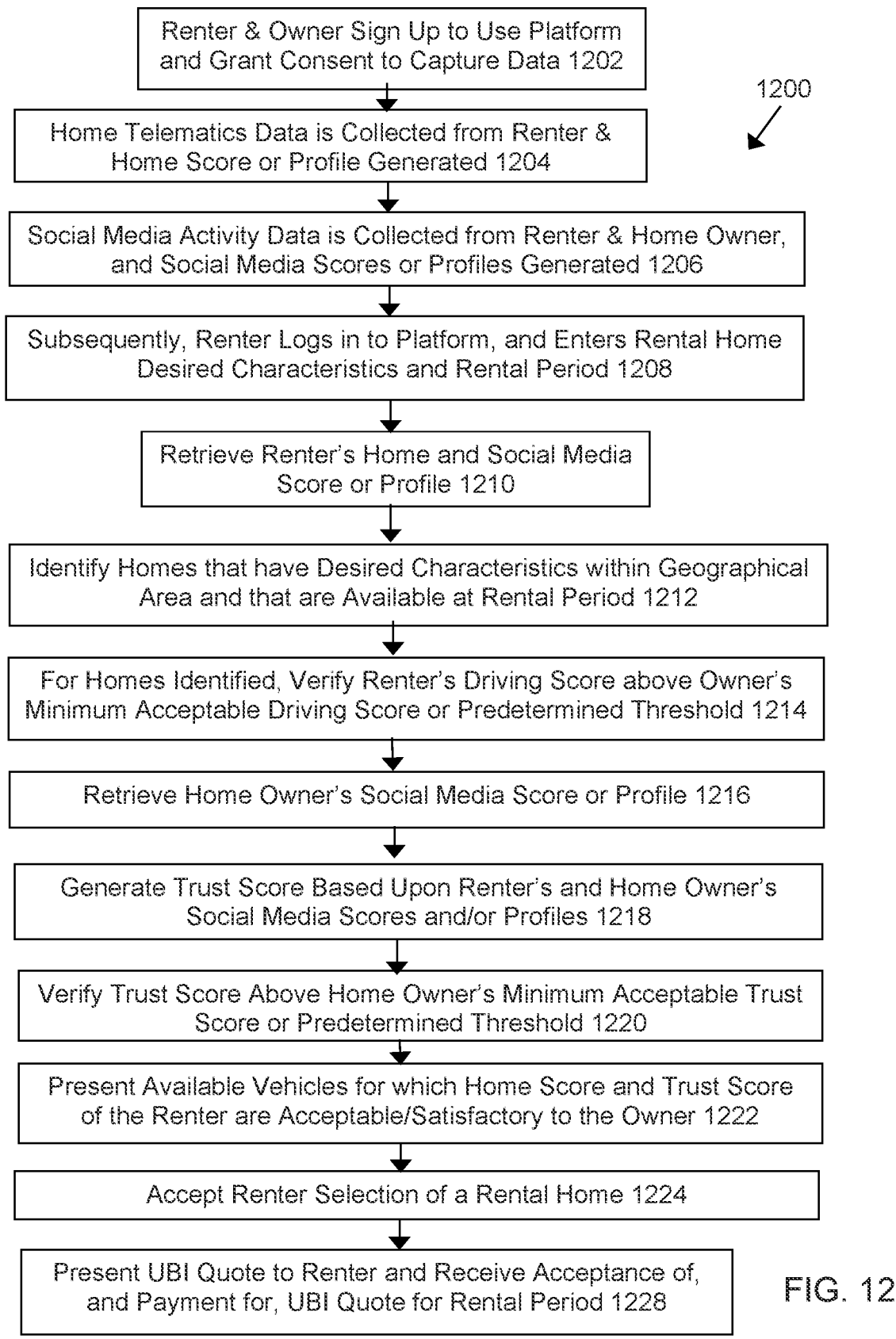
FIG. 12 illustrates an exemplary computer-implemented method of conducting a P2P rental home transaction.

FIG. 12 illustrates an exemplary computer-implemented method of conducting a P2P rental home transaction 1200. The computer-implemented method 1200 may be conducted by one or more local or remote processors, servers, transceivers, and/or sensors, and/or directed by computer executable instructions stored on non-transitory computer readable media or medium.

The method 1200 may include (home or other types of) renters and (home or other types of) owners signing up to use a sharing platform, server, or website via their mobile devices or other computing devices 1202. The renters and owners may each provide affirmative consent or permission for a remote server to gather or collect various types of data, such as home or vehicle telematics data, insurance data, credit score data, social media data, social media activity data, and other types of data, including those discussed elsewhere herein. The permission to collect data may be received, via one or more processors, transceivers, and/or remote servers, and via wireless communication or data transmission from mobile devices.

The method 1200 may include, via one or more processors, transceivers, and/or remote servers (and via wireless communication or data transmission from mobile devices, for example), collecting home (and/or vehicle) telematics data for each renter or prospective renter, and generating a risk or home score or risk or home profile for each renter based upon the home telematics data 1204. The home telematics data may include electricity usage, internet usage, water usage, presence information, time-of-day information, video or image data of occupants and pets, smart home data, home sensor data, home maintenance information, home upkeep information, and other types of home telematics data associated with risk averse behavior of the renter.

The method 1200 may include, via one or more processors, transceivers, and/or remote servers (and via wireless communication or data transmission from mobile devices, for example), collecting social media data and/or social media activity data for each renter or prospective renter, and generating a social media score or profile for each renter based upon the social media or social media activity data 1104. The social media or social media activity data may include parameters or factors discussed elsewhere herein, such as likes or dislikes, number of online friends, etc.

The method 1200 may include, the renter subsequently logging into the platform or website, and via one or more processors, transceivers, and/or remote servers (and via wireless communication or data transmission from mobile devices, for example), entering the desired characteristics of a rental items, in this case, a rental home 1208. The rental home characteristics may include location, features, square footage, number of rooms, number of bathrooms and bedrooms, garage, location, pool, distance to night life or restaurants or beaches or other popular destinations, etc. The renter may also enter a rental period and desired amount to pay 1208.

The method 1200 may include, via one or more processors, transceivers, and/or remote servers, retrieving the renter's home or homeowners score or profile and/or the renter's social media score or profile 1210 from a memory unit.

The method 1200 may include, via one or more processors, transceivers, and/or remote servers, identifying rental homes that have the renter's desired characteristics within a predetermined distance, and that are available during or at the rental period 1212.

The method 1200 may include, via one or more processors, transceivers, and/or remote servers, for each rental home that possesses the renter's desired characteristics, verifying or checking that the renter's home or homeowners score is above or meets the home owner's minimum acceptable or satisfactory driving score or otherwise meets a predetermined threshold or home score 1214.

The method 1200 may include, via one or more processors, transceivers, and/or remote servers, for each home that matches the renter's desired characteristics and for which the renter's home or other score is acceptable to the owner, retrieving the home owner's social media score or profile 1216 from a memory unit.

The method 1200 may include, via one or more processors, transceivers, and/or remote servers, for each vehicle that matches the renter's desired characteristics and for which the home or homeowner score is acceptable to the owner, generating a trust score based upon the renter's and the owner's social media or social media score or profiles 1218.

The method 1200 may include, via one or more processors, transceivers, and/or remote servers, for each vehicle that matches the renter's desired characteristics and for which the renter's home or homeowner score is acceptable to the owner, verifying that the trust score is above the vehicle owner's minimum acceptable trust score or otherwise meets a predetermined trust threshold 1220.

The method 1200 may include, via one or more processors, transceivers, and/or remote servers (and via wireless communication or data transmission to mobile devices, for example), for each home that matches the renter's desired characteristics and for which the renter's home or homeowner score is acceptable to the owner, and for which the renter/owner trust score is above or meets a minimum acceptable trust score, presenting those homes on the user interface of the platform or website for viewing available rental homes by the renter on their mobile device or other computing device 1222.

The method 1200 may include, via one or more processors, transceivers, and/or remote servers (and via wireless communication or data transmission from mobile devices, for example), receiving or accepting a renter's selection of an individual rental home 1224.

The method 1200 may include, via one or more processors, transceivers, and/or remote servers, generating a UBI (usage-based insurance) quote or UBI homeowners insurance quote for the rental home. The UBI quote may be based upon home characteristics (such as year, features, size, location, etc.), the renter's home or homeowners score or profile (such as determined from home telematics data or other data collected), and/or the renter's social media score or profile.

The method 1200 may include, via one or more processors, transceivers, and/or remote servers, presenting the UBI quote to the renter via wireless communication or data transmission to their mobile device, and receiving acceptance of, and/or electronic payment for, the UBI quote and/or UBI for the rental period and covering/insuring the rental home 1228.

The method 1200 may include, via one or more processors, transceivers, and/or remote servers, and via wireless communication or data transmission from a renter's mobile device, feedback on the owner and the owner's vehicle. The feedback may be used to adjust the vehicle owner's and/or the home's profile for presentation to future potential renters using the platform or website. The method 1200 may include additional, less, or alternate actions, including those discussed elsewhere herein.

Exemplary UBI Embodiments

In one aspect, a computer-implemented method of determining a sharing score between online user profiles based upon their social media activity data to match online renters with rental item owners may be provided. The method may include (1) receiving consent from an online renter and multiple owners, via one or more processors, servers, sensors, and/or transceivers and via wireless communication or data transmission over one or more radio frequency links, to capture data from their respective mobile devices and social media activities or websites; (2) collecting, via one or more processors, servers, sensors, and/or transceivers and via wireless communication or data transmission over one or more radio frequency links, telematics data from the online renter and generating a rental score or profile for the online renter; (3) collecting, via one or more processors, servers, sensors, and/or transceivers and via wireless communication or data transmission over one or more radio frequency links, social media activity data from the online renter's mobile device and the owner's mobile device; (4) receiving, via one or more processors, servers, sensors, and/or transceivers and via wireless communication or data transmission over one or more radio frequency links, desired rental item characteristics from the online renter's mobile device; (5) identifying, via one or more processors, servers, sensors, and/or transceivers, rental items associated with several owners that have the desired rental item characteristics; (6) for each of the rental items identified, via one or more processors, servers, sensors, and/or transceivers, generating a social media score based upon the online renter's and each vehicle owner's social media activity; and/or (7) presenting, via one or more processors, servers, sensors, and/or transceivers and via wireless communication or data transmission over one or more radio frequency links, to the online renter matching rental items (the rental items identified) and a social media score to on a display of the online renter's mobile device.

The method may include receiving, via one or more processors, servers, sensors, and/or transceivers and via wireless communication or data transmission over one or more radio frequency links, a selection of a rental item from the online renter; generating, via one or more processors, servers, sensors, and/or transceivers, a UBI quote for a rental period for the rental item based upon rental item characteristics and the online renter's telematics data; and/or transmitting, via one or more processors, servers, sensors, and/or transceivers and via wireless communication or data transmission over one or more radio frequency links, the UBI quote to the online renter's mobile device for online renter review and/or approval.

In some embodiments, the rental item may be a vehicle, the telematics data may be vehicle telematics data collected by the online renter's mobile device, and the UBI quote may be a UBI auto insurance quote. In other embodiments, the rental item may be a home, the telematics data may be home telematics data collected by the online renter's mobile device or smart home controller and/or home sensors, and the UBI quote may be a UBI homeowners insurance quote. The method may include additional, less, or alternate actions, including those discussed elsewhere herein.

In another aspect, a matching computer system for determining a sharing score between online user profiles based upon their social media activity data to facilitate P2P online transactions may be provided. The matching computer system including at least one processor in communication with at least one memory device, wherein the at least one processor may be configured to: (1) receive consent, via an online renter and multiple owners, to capture data from their respective mobile devices and social media activities or websites; (2) collect telematics data from the online renter and generating a rental score or profile for the online renter; (3) collect social media activity data from the online renter's mobile device and the owner's mobile device; (4) receive desired rental item characteristics from the online renter's mobile device; (5) identify rental items associated with several owners that have the desired rental item characteristics; (6) for each of the rental items identified, generate a social media score based upon the online renter's and each vehicle owner's social media activity; and/or (7) present to the online renter matching rental items (the rental items identified) and a social media score to on a display of the online renter's mobile device.

The at least one processor is configured to: receive a selection of a rental item from the online renter; generate a UBI quote for a rental period for the rental item based upon rental item characteristics and the online renter's telematics data; and/or transmit the UBI quote to the online renter's mobile device for online renter review and/or approval.

In one embodiment, the rental item may be a vehicle, the telematics data may be vehicle telematics data collected by the online renter's mobile device, and the UBI quote may be a UBI auto insurance quote. In another embodiment, the rental item may be a home, the telematics data may be home telematics data collected by the online renter's mobile device or smart home controller and/or home sensors, and the UBI quote may be a UBI homeowners insurance quote. The computer system may include additional, less, or alternate functionality, including that discussed elsewhere herein.

Additional Embodiments

In an additional embodiment, a matching computer system for determining a sharing score between online user profiles is provided. The matching computer system includes at least one processor in communication with at least one memory device. The at least processor is configured to generate a first online user profile associated with a first user. The first online user profile includes at least one of first insurance data, first social media data, first third party data, first user data, and first sharing data associated with a first user. The at least one processor is also configured to generate a second online user profile associated with a second user. The second online user profile includes at least one of second insurance data, second social media data, second third party data, second user data, and second sharing data associated with a second user. The at least one processor is further configured to calculate a first base score associated with the first user based upon the first online user profile. The first base score represents a first level of trustworthiness of the first user. The at least one processor is also configured to calculate a second base score associated with the second user based upon the second online user profile. The second base score represents a second level of trustworthiness of the second user. The at least one processor is further configured to determine a sharing score between the first and second users based upon the first and second base scores. The sharing score represents a level of matching between the first online user profile and the second online user profile.

An additional feature may be where the at least one processor is configured to: receive a first user-type associated with the first user and a second user-type associated with the second user; calculate the first base score based upon the first user-type; and calculate the second base score based upon the second user-type.

An additional feature may be where the at least one processor is configured to generate a graphical user interface that is configured to display the first base score and the second base score, and display the sharing score between the first user and the second user.

In an additional embodiment, a matching computer system for determining a sharing score between online user profiles is provided. The matching computer system includes at least one processor in communication with at least one memory device. The at least one processor is configured to receive a user-listing associated with a first user. The user-listing includes a plurality of items offered for at least sale, rent, and lease. The first user may be associated with a first user-type corresponding to an owner. The at least one processor is also configured to calculate an item base score for each of the plurality of items. Each item base score is calculated based upon a first online user profile associated with the first user. The at least one processor is further configured to calculate a second user base score based upon a second online user profile associated with a second user. The second user may be associated with a second user-type corresponding to a renter. The at least one processor is also configured to determine a sharing score between each of the plurality of items and the second user. Each sharing score is based upon each respective item base score and the second user base score. Each sharing score represents a level of matching between each item and the second online user profile.

An additional feature may be where the user-listing includes listing availability dates and listing rates associated with the listing availability dates.

An additional feature may be where the at least one processor is configured to generate a graphical user interface. that is configured to display the user-listing associated with the first user. The graphical user interface is also configured to receive a first selection input from the second user. The first selection input indicates at least one selected item from the user-listing. The graphical user interface is further configured to display, in response to receiving the first selection input, the sharing score between the at least one selected item and the second user.

Another additional feature may be where the at least one processor is configured to generate a graphical user interface that is configured to display, in response to receiving the first selection input, at least one listing availability date and the associated listing rate. The graphical user interface is also configured to receive a second selection input from the second user. The second selection input indicates an available date. The graphical user interface is further configured to concurrently display a location on a map of the at least one selected item and details associated with the at least one selected item.

An additional feature may be where the at least one processor is configured to generate a graphical user interface that is configured to display the user-listing and each determined sharing score between each of the plurality of items and the second user.

Another additional feature may be where the plurality of items includes at least one of goods and services.

In an additional embodiment, a computer-implemented method for determining a sharing score between online user profiles is provided. The method is implemented by a matching computer system including at least one processor. The method includes generating a first online user profile associated with a first user. The first online user profile includes at least one of first insurance data, first social media data, first third party data, first user data, and first sharing data associated with a first user. The method also includes generating a second online user profile associated with a second user. The second online user profile includes at least one of second insurance data, second social media data, second third party data, second user data, and second sharing data associated with a second user. The method further includes calculating a first base score associated with the first user based upon the first online user profile. The first base score represents a first level of trustworthiness of the first user. The method also includes calculating a second base score associated with the second user based upon the second online user profile. The second base score represents a second level of trustworthiness of the second user. The method further includes determining a sharing score between the first and second users based upon the first and second base scores. The sharing score represents a level of matching between the first online user profile and the second online user profile.

An additional feature may be where the method includes receiving a first user-type associated with the first user and a second user-type associated with the second user. The method also includes calculating the first base score based upon the first user-type; and calculating the second base score based upon the second user-type.

Another additional feature may be where the method includes generating a graphical user interface that is configured to display the first base score and the second base score; and display the sharing score between the first user and the second user.

In an additional embodiment, a computer-implemented method for determining a sharing score between online user profiles is provided. The method is implemented by a matching computer system including at least one processor. The method includes receiving a user-listing associated with a first user. The user-listing includes a plurality of items offered for at least sale, rent, and lease, and the first user may be associated with a first user-type corresponding to an owner. The method also includes calculating an item base score for each of the plurality of items. Each item base score calculated based upon a first online user profile associated with the first user. The method further includes calculating a second user base score based upon a second online user profile associated with a second user that may be associated with a second user-type corresponding to a renter. The method also includes determining a sharing score between each of the plurality of items and the second user. Each sharing score is based upon each respective item base score and the second user base score, and each sharing score represents a level of matching between each item and the second online user profile.

An additional feature may be where the user-listing includes listing availability dates and listing rates associated with the listing availability dates.

Another additional feature may be where the method includes generating a graphical user interface that is configured to display the user-listing associated with the first user, and receive a first selection input from the second user. The first selection input indicates at least one selected item from the user-listing. The graphical user interface is also configured to display, in response to receiving the first selection input, the sharing score between the at least one selected item and the second user.

An additional feature may be where the method includes generating a graphical user interface that is configured to display, in response to receiving the first selection input, at least one listing availability date and the associated listing rate. The graphical user interface is also configured to receive a second selection input from the second user. The second selection input indicates an available date. The graphical user interface is further configured to concurrently display a location on a map of the at least one selected item and details associated with the at least one selected item.

Another additional feature may be where the method includes generating a graphical user interface that is configured to display the user-listing and each determined sharing score between each of the plurality of items and the second user.

An additional feature may be where the plurality of items includes at least one of goods and services.

In an additional embodiment, at least one non-transitory computer-readable storage media having computer-executable instructions embodied thereon for determining a sharing score between online user profiles is provided. When executed by at least one processor, the computer-executable instructions cause the processor to generate a first online user profile associated with a first user. The first online user profile includes at least one of first insurance data, first social media data, first third party data, first user data, and first sharing data associated with a first user. The computer-executable instructions also cause the processor to generate a second online user profile associated with a second user. The second online user profile includes at least one of second insurance data, second social media data, second third party data, second user data, and second sharing data associated with a second user. The computer-executable instructions further cause the processor to calculate a first base score associated with the first user based upon the first online user profile The first base score represents a first level of trustworthiness of the first user. The computer-executable instructions also cause the processor to calculate a second base score associated with the second user based upon the second online user profile. The second base score represents a second level of trustworthiness of the second user. The computer-executable instructions further cause the processor to determine a sharing score between the first and second users based upon the first and second base scores. The sharing score represents a level of matching between the first online user profile and the second online user profile.

An additional feature may be where the computer-executable instructions cause the processor to receive a first user-type associated with the first user and a second user-type associated with the second user. The computer-executable instructions also cause the processor to calculate the first base score based upon the first user-type, and calculate the second base score based upon the second user-type.

Another additional feature may be where the computer-executable instructions cause the processor to generate a graphical user interface that is configured to display the first base score and the second base score, and display the sharing score between the first user and the second user.

In an additional embodiment, at least one non-transitory computer-readable storage media having computer-executable instructions embodied thereon for determining a sharing score between online user profiles is provided. When executed by at least one processor, the computer-executable instructions cause the processor to receive a user-listing associated with a first user. The user-listing includes a plurality of items offered for at least sale, rent, and lease, and the first user may be associated with a first user-type corresponding to an owner. The computer-executable instructions also cause the processor to calculate an item base score for each of the plurality of items. Each item base score calculated based upon a first online user profile associated with the first user. The computer-executable instructions further cause the processor to calculate a second user base score based upon a second online user profile associated with a second user that may be associated with a second user-type corresponding to a renter. The computer-executable instructions also cause the processor to determine a sharing score between each of the plurality of items and the second user. Each sharing score is based upon each respective item base score and the second user base score, and each sharing score represents a level of matching between each item and the second online user profile.

An additional feature may be where the user-listing includes listing availability dates and listing rates associated with the listing availability dates.

Another additional feature may be where the computer-executable instructions cause the processor to generate a graphical user interface that is configured to display the user-listing associated with the first user. The graphical user interface is also configured to receive a first selection input from the second user. The first selection input indicates at least one selected item from the user-listing. The graphical user interface is further configured to display, in response to receiving the first selection input, the sharing score between the at least one selected item and the second user.

An additional feature may be where the computer-executable instructions cause the processor to generate a graphical user interface that is configured to display, in response to receiving the first selection input, at least one listing availability date and the associated listing rate. The graphical user interface is also configured to receive a second selection input from the second user. The second selection input indicates an available date. The graphical user interface is further configured to concurrently display a location on a map of the at least one selected item and details associated with the at least one selected item.

Another additional feature may be where the computer-executable instructions cause the processor to generate a graphical user interface that is configured to display the user-listing and each determined sharing score between each of the plurality of items and the second user.

An additional feature may be where the plurality of items includes at least one of goods and services.

In an additional embodiment, at least one non-transitory computer-readable storage media having computer-executable instructions embodied thereon for determining a trust score for a user based upon at least social media data and insurance data is provided. When executed by at least one processor included in a matching computer system, the computer-executable instructions cause the at least one processor to collect insurance data including telematics data from each registered user.

An additional feature may be where each registered user is one of a consumer and a provider. The consumer may be associated with a consumer computing device, and the provider may be associated with a provider computing device.

Another additional feature may be where the trust score is one of a consumer trust score associated with the consumer and a provider trust score associated with the provider.

An additional feature may be where the computer-executable instructions cause the at least one processor to compare the provider trust score to one or more consumer thresholds. Each consumer threshold is associated with each consumer. The computer-executable instructions also cause the at least one processor to determine, based upon the comparison, one or more consumers having the respective consumer threshold being satisfied by the provider trust score. The computer-executable instructions further cause the at least one processor to cause to display, on the provider computing device, the one or more one consumers.

Another additional feature may be where the computer-executable instructions cause the at least one processor to compare the consumer trust score to one or more provider thresholds. Each provider threshold is associated with each provider. The computer-executable instructions also cause the at least one processor to determine, based upon the comparison, one or more providers having the respective provider threshold being satisfied by the consumer trust score. The computer-executable instructions also cause the at least one processor to cause to display, on the consumer computing device, one or more items offered by the determined one or more providers.

An additional feature may be where the computer-executable instructions cause the at least one processor to receive a selection of a one of the one or more items offered by the determined one or more providers. The computer-executable instructions also cause the at least one processor to generate a user-based insurance (UBI) quote for a rental period for the selected item based upon item characteristics of the selected item and telematics data collected from the consumer. The computer-executable instructions further cause the at least one processor to transmit the UBI quote to the consumer computing device. The computer-executable instructions also cause the at least one processor to cause to display, on the consumer computing device, the UBI quote for at least one of review and approval by the consumer.

Another additional feature may be where the selected item is a vehicle, the telematics data is vehicle telematics data collected via the consumer computing device, and the UBI quote is a UBI auto insurance quote.

An additional feature may be where the selected item is a home, the telematics data is home telematics data collected via at least one of the consumer computing device, a smart home controller, and home sensors, and the UBI quote is a UBI homeowners insurance quote.

Another additional feature may be where the computer-executable instructions cause the at least one processor to determine a social media score for each registered user based upon each respective social media data. The computer-executable instructions also cause the at least one processor to determine the trust score for each registered user based, at least in part, upon each respective social media score and each respective insurance data.

Additional Considerations

With the foregoing, an insurance customer may opt-in to a social insurance group or other type of program. After the insurance customer provides their affirmative consent, an insurance provider remote server may collect data from the member's mobile device, user computing device, or, if the asset includes a computing device (e.g., a smart vehicle, autonomous or semi-autonomous vehicle, smart home controller, or other smart devices)—such as with the customer's permission or affirmative consent. The data collected may be related to social insurance group activity and/or individual member activity for insured assets before (and/or after) an insurance-related event, including those events discussed elsewhere herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for the social insurance group includes opt-in informed consent of users to data usage by the interactive 3D image projection system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive application data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

We claim:

1. A matching computer system for determining a trust score for a user based upon at least telematics data, social media data, and insurance data, the matching computer system including at least one processor in communication with at least one memory device, wherein the at least one processor is configured to:
   register, with the matching computer system, one or more users;
   receive consent from the one or more users to capture the social media data associated with social media activities of each respective user, and the telematics data associated with usage of one or more items that each respective user is interested in at least one of renting and offering for rent;
   collect the social media data and the insurance data from each registered user, wherein the social media data is collected from at least one social media platform and the insurance data is collected from at least one insurance provider server;
   collect, via one or more sensors associated with the one or more items, the telematics data;
   store, within the at least one memory device, the social media data, the insurance data, and the telematics data;
   retrieve the telematics data, the social media data, and the insurance data associated with each registered user;
   apply a scoring algorithm to each respective telematics data, each respective social media data, and each respective insurance data, wherein the scoring algorithm is automatically updated and refined, by the matching computer system, by utilizing a feedback data transmission from a user computing device associated with each registered user, and wherein the feedback data transmission is associated with at least one previous transaction conducted by each registered user; and
   determine a trust score for each registered user based, at least in part, upon the application of the scoring algorithm to each respective telematics data, each respective social media data, and each respective insurance data, wherein the trust score represents a level of trustworthiness of the user.

2. The matching computer system of claim 1, wherein the insurance data includes additional telematics data associated with each registered user.

3. The matching computer system of claim 1, wherein each registered user is one of a consumer and a provider, wherein the consumer is associated with a consumer computing device, wherein the provider is associated with a provider computing device, wherein the consumer is interested in renting the one or more items, and wherein the provider is interested in offering for rent the one or more items.

4. The matching computer system of claim 3, wherein the trust score is one of a consumer trust score associated with the consumer and a provider trust score associated with the provider.

5. The matching computer system of claim 4, wherein the at least one processor is configured to:
   compare the provider trust score to one or more consumer thresholds, each consumer threshold associated with each consumer;
   determine, based upon the comparison, one or more consumers having the respective consumer threshold being satisfied by the provider trust score; and
   cause to display, on the provider computing device, the one or more one consumers.

6. The matching computer system of claim 4, wherein the at least one processor is configured to:
   compare the consumer trust score to one or more provider thresholds, each provider threshold associated with each provider;
   determine, based upon the comparison, one or more providers having the respective provider threshold being satisfied by the consumer trust score; and
   cause to display, on the consumer computing device, the one or more items offered by the determined one or more providers.

7. The matching computer system of claim 6, wherein the at least one processor is configured to:
   receive a selection of a one of the one or more items offered by the determined one or more providers;
   generate a user-based insurance (UBI) quote for a rental period for the selected item based upon item characteristics of the selected item and consumer telematics data collected from the consumer;
   transmit the UBI quote to the consumer computing device; and
   cause to display, on the consumer computing device, the UBI quote for at least one of review and approval by the consumer.

8. The matching computer system of claim 7, wherein the selected item is a vehicle, the telematics data is vehicle telematics data collected via the consumer computing device, and the UBI quote is a UBI auto insurance quote.

9. The matching computer system of claim 7, wherein the selected item is a home, the telematics data is home telematics data collected via at least one of the consumer computing device, a smart home controller, and home sensors, and the UBI quote is a UBI homeowners insurance quote.

10. The matching computer system of claim 1, wherein the at least one processor is configured to:
- determine a social media score for each registered user based upon each respective social media data; and
- determine the trust score for each registered user based, at least in part, upon each respective social media score and each respective insurance data.

11. A computer-implemented method of determining a trust score for a user based upon at least telematics data, social media data, and insurance data, the method implemented by a matching computer system in communication with at least one memory device, the method comprising:
- registering, with the matching computer system via one or more processors, servers, sensors, and/or transceivers, one or more users;
- receiving, via the one or more processors, servers, sensors, and/or transceivers and via wireless communication or data transmission over one or more radio frequency links, consent from the one or more users to capture the social media data associated with social media activities of each respective user, and the telematics data associated with usage of one or more items that each respective user is interested in at least one of renting and offering for rent;
- collecting, via the one or more processors, servers, sensors, and/or transceivers and via the wireless communication or data transmission over one or more radio frequency links, the social media data and the insurance data from each registered user, wherein the social media data is collected from at least one social media platform and the insurance data is collected from at least one insurance provider server;
- collecting, via the one or more processors, servers, sensors, and/or transceivers and via the wireless communication or data transmission over one or more radio frequency links, the telematics data;
- storing, within the at least one memory device, the social media data, the insurance data, and the telematics data;
- retrieving, via the one or more processors, servers, sensors, and/or transceivers, the telematics data, social media data, and insurance data associated with each registered user;
- applying a scoring algorithm to each respective telematics data, each respective social media data, and each respective insurance data, wherein the scoring algorithm is automatically updated and refined, by the matching computer system, by utilizing a feedback data transmission from a user computing device associated with each registered user, and wherein the feedback data transmission is associated with at least one previous transaction conducted by each registered user; and
- determining, via the one or more processors, servers, sensors, and/or transceivers, a trust score for each registered user based, at least in part, upon the application of the scoring algorithm to each respective telematics data, each respective social media data, and each respective insurance data, wherein the trust score represents a level of trustworthiness of the user.

12. The computer-implemented method of claim 11, wherein the insurance data includes additional telematics data associated with each registered user.

13. The computer-implemented method of claim 11, wherein each registered user is one of a consumer and a provider, wherein the consumer is associated with a consumer computing device, wherein the provider is associated with a provider computing device, wherein the consumer is interested in renting the one or more items, and wherein the provider is interested in offering for rent the one or more items.

14. The computer-implemented method of claim 13, wherein the trust score is one of a consumer trust score associated with the consumer and a provider trust score associated with the provider.

15. The computer-implemented method of claim 14, wherein the method further comprises:
- comparing, via the one or more processors, servers, sensors, and/or transceivers, the provider trust score to one or more consumer thresholds, each consumer threshold associated with each consumer;
- determining, based upon the comparison, via the one or more processors, servers, sensors, and/or transceivers, one or more consumers having the respective consumer threshold being satisfied by the provider trust score; and
- causing to display, on the provider computing device, via the one or more processors, servers, sensors, and/or transceivers and via the wireless communication or data transmission over one or more radio frequency links, the one or more one consumers.

16. The computer-implemented method of claim 14, wherein the method further comprises:
- comparing, via the one or more processors, servers, sensors, and/or transceivers, the consumer trust score to one or more provider thresholds, each provider threshold associated with each provider;
- determining, based upon the comparison via the one or more processors, servers, sensors, and/or transceivers, one or more providers having the respective provider threshold being satisfied by the consumer trust score; and
- causing to display, on the consumer computing device, via the one or more processors, servers, sensors, and/or transceivers and via the wireless communication or data transmission over one or more radio frequency links, the one or more items offered by the determined one or more providers.

17. The computer-implemented method claim 16, wherein the method further comprises:
- receiving, via the one or more processors, servers, sensors, and/or transceivers and via the wireless communication or data transmission over one or more radio frequency links, a selection of a one of the one or more items offered by the determined one or more providers;
- generating, via the one or more processors, servers, sensors, and/or transceivers, a user-based insurance (UBI) quote for a rental period for the selected item based upon item characteristics of the selected item and consumer telematics data collected from the consumer;
- transmitting, via the one or more processors, servers, sensors, and/or transceivers and via the wireless communication or data transmission over one or more radio frequency links, the UBI quote to the consumer computing device; and
- causing to display, on the consumer computing device, via the one or more processors, servers, sensors, and/or transceivers and via the wireless communication or data transmission over one or more radio frequency links, the UBI quote for at least one of review and approval by the consumer.

18. The computer-implemented method of claim 17, wherein the selected item is a vehicle, the telematics data is vehicle telematics data collected via the consumer computing device, and the UBI quote is a UBI auto insurance quote.

19. The computer-implemented method of claim 17, wherein the selected item is a home, the telematics data is home telematics data collected via at least one of the consumer computing device, a smart home controller, and home sensors, and the UBI quote is a UBI homeowners insurance quote.

20. The computer-implemented method of claim 11, wherein the method further comprises:
   determining, via the one or more processors, servers, sensors, and/or transceivers, a social media score for each registered user based upon each respective social media data; and
   determining, via the one or more processors, servers, sensors, and/or transceivers, the trust score for each registered user based, at least in part, upon each respective social media score and each respective insurance data.

21. At least one non-transitory computer-readable storage media having computer-executable instructions embodied thereon for determining a trust score for a user based upon at least telematics data, social media data, and insurance data, wherein when executed by at least one processor included in a matching computer system and in communication with at least one memory device, the computer-executable instructions cause the at least one processor to:
   register, with the matching computer system, one or more users;
   receive consent from the one or more users to capture the social media data associated with social media activities of each respective user, and the telematics data associated with usage of one or more items that each respective user is interested in at least one of renting and offering for rent;
   collect the social media data and the insurance data from each registered user, wherein the social media data is collected from at least one social media platform and the insurance data is collected from at least one insurance provider server;
   collect, via one or more sensors associated with the one or more items, the telematics data;
   store, within the at least one memory device, the social media data, the insurance data, and the telematics data;
   retrieve the telematics data, the social media data, and the insurance data associated with each registered user;
   apply a scoring algorithm to each respective telematics data, each respective social media data, and each respective insurance data, wherein the scoring algorithm is automatically updated and refined, by the matching computer system, by utilizing a feedback data transmission from a user computing device associated with each registered user, and wherein the feedback data transmission is associated with at least one previous transaction conducted by each registered user; and
   determine a trust score for each registered user based, at least in part, upon the application of the scoring algorithm to each respective telematics data, each respective social media data, and each respective insurance data, wherein the trust score represents a level of trustworthiness of the user.

* * * * *